(12) United States Patent
Zeng et al.

(10) Patent No.: US 7,406,801 B2
(45) Date of Patent: *Aug. 5, 2008

(54) WATERTIGHT DECKING

(76) Inventors: Karl Zeng, 1499 Highway 49, Russellville, AL (US) 35653; Bobby Reed, 772 Plantation Way, Gallatin, TX (US) 37066

( * ) Notice: Subject to any disclaimer, the term of this patent is extended or adjusted under 35 U.S.C. 154(b) by 4 days.

This patent is subject to a terminal disclaimer.

(21) Appl. No.: 11/511,249

(22) Filed: Aug. 29, 2006

(65) Prior Publication Data

US 2006/0288651 A1 Dec. 28, 2006

Related U.S. Application Data

(63) Continuation-in-part of application No. 11/203,163, filed on Aug. 15, 2005, which is a continuation-in-part of application No. 10/770,481, filed on Feb. 4, 2004, now Pat. No. 7,021,012.

(51) Int. Cl.
*E04B 5/02* (2006.01)
(52) U.S. Cl. ............... 52/177; 52/592.1; 52/588.1; 52/302.4; 52/483.1
(58) Field of Classification Search ............ 52/177, 52/592.1, 588.1, 480, 650.3, 100, 731.1, 52/732.2, 589.1, 592.4, 591.1, 730.4, 730.5, 52/731.2, 731.3, 539, 302.3, 302.4, 483.1; 428/57; 220/1.5; 404/41; 14/73, 77.1; 114/45, 114/364
See application file for complete search history.

(56) References Cited

U.S. PATENT DOCUMENTS 3,043,407 A * 7/1962 Marryatt ............... 52/588.1
3,046,852 A * 7/1962 Graham ................. 52/581
3,110,371 A * 11/1963 De Ridder ............. 52/588.1
3,301,147 A * 1/1967 Clayton et al. ............ 404/35
3,385,182 A * 5/1968 Harvey ................. 404/35
3,385,183 A * 5/1968 Kortz ................... 404/35
4,112,632 A 9/1978 Simpson
4,126,006 A * 11/1978 Lewis .................. 405/220
4,266,381 A * 5/1981 Deller .................. 52/177
4,266,385 A 5/1981 Oehlert
4,423,572 A 1/1984 Tor
4,739,599 A 4/1988 Lopez et al.

(Continued)

FOREIGN PATENT DOCUMENTS

JP        6-108589       4/1994

*Primary Examiner*—Robert Canfield
*Assistant Examiner*—Jessie Fonseca
(74) *Attorney, Agent, or Firm*—Richard C. Litman

(57) ABSTRACT

The watertight decking is assembled from extruded panels to form a watertight deck assembly. First side, second side, and intermediate panels have complementary edges mating with other corresponding panels. One edge of the first side and intermediate panels has a drainage gutter and the tongue or groove of a tongue and groove connection, with mating second side and intermediate panel edges having the mating tongue or groove. A depending drip rail wedges tightly against the opposite gutter wall of the adjoining panel to prevent relative motion between the two, and also to prevent capillary flow of liquid across the underside of the panel where it could leak into the area below. Additional sealing may be provided along the tongue and groove joints. A second, lower wall opposite the upper wall defines a series of conduits therebetween, and also strengthens the panels and provides a finished appearance for the underside.

20 Claims, 23 Drawing Sheets

U.S. PATENT DOCUMENTS

| | | | |
|---|---|---|---|
| 4,758,128 A * | 7/1988 | Law | 414/477 |
| 5,050,361 A | 9/1991 | Hallsten | |
| 5,170,605 A * | 12/1992 | Huddle | 52/588.1 |
| 5,185,193 A * | 2/1993 | Phenicie et al. | 428/57 |
| 5,647,184 A | 7/1997 | Davis | |
| 5,758,467 A | 6/1998 | Snear et al. | |
| 5,765,328 A | 6/1998 | Moore | |
| 5,782,044 A * | 7/1998 | Dodd et al. | 345/629 |
| 5,797,237 A | 8/1998 | Finkell, Jr. | |
| 5,816,010 A * | 10/1998 | Conn | 52/588.1 |
| 6,158,191 A | 12/2000 | Seem | |
| 6,199,340 B1 * | 3/2001 | Davis | 52/592.1 |
| 6,226,950 B1 * | 5/2001 | Davis | 52/592.1 |
| 6,324,796 B1 * | 12/2001 | Heath | 52/177 |
| 6,427,395 B1 | 8/2002 | Elsasser et al. | |
| 6,918,221 B2 * | 7/2005 | Williams | 52/592.1 |
| 7,021,012 B2 * | 4/2006 | Zeng et al. | 52/177 |
| 2006/0288651 A1 * | 12/2006 | Zeng et al. | 52/177 |
| 2007/0044416 A1 * | 3/2007 | Van Dijk | 52/650.3 |

\* cited by examiner

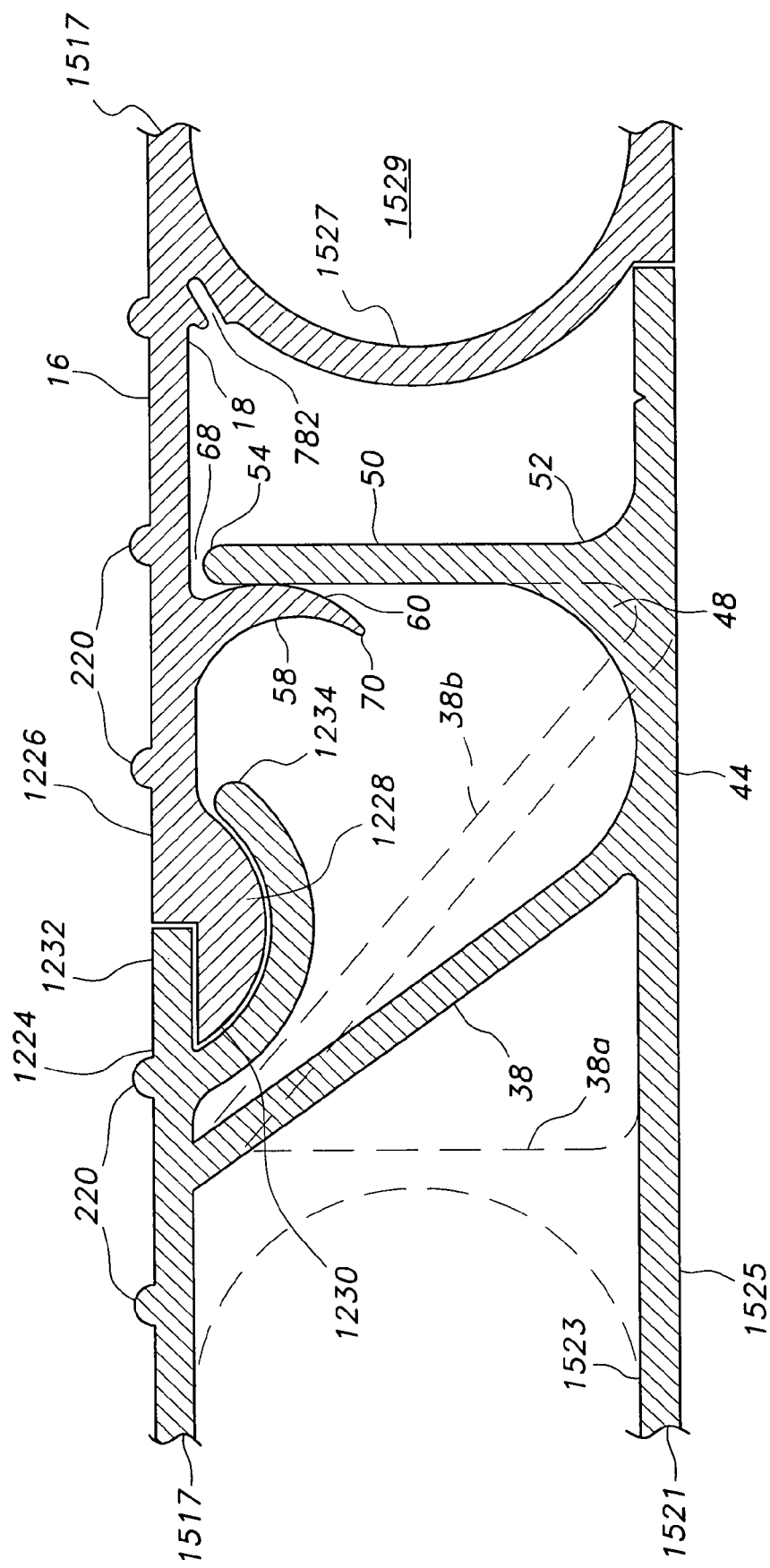

WATERTIGHT DECKING

REFERENCE TO RELATED PATENT APPLICATIONS

This application is a continuation in part of U.S. patent application Ser. No. 11/203,163 filed on Aug. 15, 2005, which is a continuation in part of U.S. patent application Ser. No. 10/770,481 filed on Feb. 4, 2004 and issued on Apr. 4, 2006 as U.S. Pat. No. 7,021,012, incorporated herein by reference in its entirety.

BACKGROUND OF THE INVENTION

1. Field of the Invention

The present invention relates generally to extruded panels, and more particularly to a series of panel extrusions configured to interlock tightly and immovably with one another, and also to preclude moisture passage through the joints between panels. The present watertight decking may be installed as a deck or similar surface over a room, storage area, or other space that must be kept dry, and thereby serves dual purposes as flooring and as a waterproof roof structure over the underlying area. The undersides of the panels may include a bottom surface defining one or more passages between the panel surfaces, with additional conduits being optionally provided for the passage of fluids (air, water, etc.) therethrough for heating, cooling, and/or other purposes. The bottom surface also strengthens the panels considerably by providing a closed structure.

2. Description of the Related Art

Decks and similar structures serving as built-up surfaces for walking thereon and/or for supporting other articles, have conventionally been constructed of wood boards or sheet material (pressboard, plywood, etc.). The use of such materials requires additional waterproofing (e.g., tarpaper, etc.) beneath the deck surface, if a truly waterproof deck is required. Moreover, wood is not particularly durable when used as a deck surface or in other areas where considerable wear and tear may occur, and at the very least must be treated in some manner (pressure treatment, paint, etc.) in order to resist deterioration due to moisture.

As a result, various manufacturers have developed extruded panels, generally of aluminum or other durable metal but also of plastic, which may be assembled to form a more durable and wear resistant deck assembly. Such decks are particularly useful in the maritime industry, where the deck material is subjected to water and moisture on a nearly constant basis. The aluminum and (to some extent) plastics used in such extruded panels provide a significant improvement in resistance to deterioration when compared to wood.

However, the fact that such panels are somewhat limited in their maximum width due to constraints involved in the extrusion process and shipping, results in the need to assemble a series of such extrusions together in order to provide the desired width for most deck installations. While such an assembly can be constructed to form a structurally sound installation, the slight gaps between the assembled panels generally allow rain or other moisture to pass therethrough. Thus, such extruded panels are generally unsuitable for use as a deck or roof surface overlying a room or other area which must be kept dry, unless additional waterproofing in the form of an underlying substructure covered with tarpaper, plastic sheeting, or some other waterproof material, is provided. While some attempts have been made to form extrusions that provide a truly waterproof joint, the fact remains that none of the decking extrusions of which the present inventors are aware provide a truly waterproof surface when assembled.

When such extruded panels are used to cover an underlying room or the like, the unfinished appearance of the underlying exposed surfaces of the panels is unattractive. Moreover, the relatively thin single wall, sheet or ply of the upper surface of the panels provides practically no insulation. With only a single wall, there is no provision for using the thickness of the panels as a fluid conduit(s) for heating or cooling the underlying or overlying area, or perhaps for other purposes, e.g. for the enclosure of electrical wiring therein, etc. In addition, the single upper closed wall or ply must be made relatively thick to provide sufficient strength to support the weight of persons, equipment, etc. placed thereon.

The present invention responds to these needs with a series of planks having specialized extruded cross sections, which assemble tightly together to substantially eliminate water or other liquid penetration therebetween. Any water or other liquid which does penetrate the tightly interlocked joints of the present decking extrusions is directed to drain channels formed integrally with the extrusions, where the liquid is drained away from the deck. The present watertight decking may be formed in a variety of different configurations, with the interlocking tongue and groove connections of adjoining panels extending from an edge adjacent or opposite the underlying drain channel, positive interlocking means between adjacent panels, different drain channel configurations, and/or additional sealing means, as desired. Moreover, the panels may have a lower surface or wall opposite the upper surface or wall, with the two walls or surfaces defining a series of utility passages therebetween for heating or cooling fluids, electrical wiring, etc., as desired. The second, lower wall or surface also provides significantly greater strength and resistance to bending than provided by a single ply panel.

A discussion of the related art of which the present inventors are aware, and its differences and distinctions from the present invention, are provided below.

U.S. Pat. No. 4,112,632 issued on Sep. 12, 1978 to Harold G. Simpson, titled "Prefabricated Watertight Structural System," describes a complex roof panel installation having fascia, gutters, and other elements in addition to the roof panels. The panels of the Simpson system are composite, i.e., formed of thin metal sheets covered with a thin layer of Hypalon® plastic. The sheets interlock together, but require additional structure therebelow to provide sufficient support. The Simpson roof panels are so thin and light, that they cannot support the weight of a person thereon by themselves. Simpson does not provide any form of drain channels beneath his roof panels. Also, while Simpson does provide upper and lower surfaces in his roof panels, he fills the space therebetween with solid insulation, precluding the use of the space as a conduit for fluid flow or other purposes.

U.S. Pat. No. 4,266,385 issued on May 12, 1981 to James A. Oehlert, titled "Interlocking Building Panel Construction," describes paneling for roofs or walls comprising thin sheet metal units having interlocking edges. However, the interlocking portions are upstanding when the panels are used for roofing. The raised interlocked edges render the Oehlert panels unsuitable for use as a deck for walking upon. In any event, the thin sheet metal from which the Oehlert panels are formed do not provide sufficient structural strength to serve as a deck. While Oehlert does provide channels within the interlocked edges of his panels, they are not waterproof, as fasteners are driven through the floors of the channels to anchor the assembly to the underlying structure. Oehlert does not provide any secondary bottom surface for his panels.

U.S. Pat. No. 4,423,572 issued on Jan. 3, 1984 to Edward S. Tor, titled "Water-Tight Insulated Roof Construction For House," describes another roof assembly formed of a series of interlocking thin sheet metal panels. As in the case of the panels of the Oehlert '385 U.S. patent, the Tor panels have raised interlocking joints which would preclude their use as a walking surface. Moreover, the thin sheet metal of the Tor panels do not provide sufficient structural strength for walking upon and/or supporting relatively heavy articles, e.g., outdoor furniture, etc., as would normally be found on a deck. Tor does not provide a bottom surface opposite the upper surface of his panels to define a conduit or other utility space therebetween.

U.S. Pat. No. 4,739,599 issued on Apr. 26, 1988 to Serapio E. Lopez et al., titled "Energy Dissipation Structure For Securing Lightweight Roofing Elements," describes a roofing system utilizing a series of relatively thin paving blocks which abut one another. The blocks are secured to the underlying structure by buttons atop the blocks, with springs secured to the buttons to hold the blocks down. The blocks do not interlock, nor are their joints waterproof. Some additional waterproofing means (e.g., tarpaper, etc.) must be placed upon the underlying roof structure before the blocks are installed. While the blocks overlay a lower sheathing surface, this construction differs from the present invention in that the assembly is not a unitary, monolithic extrusion, and the space between the upper and lower surfaces is filled with solid blocks rather than providing a space for the circulation of fluids therein or the routing of conduits therethrough.

U.S. Pat. No. 5,050,361 issued on Sep. 24, 1991 to John Hallsten, titled "Deck Structure," describes an assembly of extruded panels for constructing a floating dock or the like. The panels of the Hallsten structure interlock, but no waterproof joints are provided due to their environment as a dock overlying a body of water. Accordingly, Hallsten does not provide any form of drainage channels or gutters beneath the joints of his panels, whereas the present extruded panels include such drainage channels underlying each joint between panels. No secondary lower wall opposite the upper wall or layer and defining a fluid circulatory or conduit routing space is provided by Hallsten.

U.S. Pat. No. 5,647,184 issued on Jul. 15, 1997 to Harry H. Davis, titled "Modular Decking Plank, And Decking Structure," describes a relatively thick extrusion having top and bottom surfaces with a series of webs or ribs therebetween. Each panel has a laterally extending tongue which engages a slot in the adjacent mating panel. The configuration of the panels is such that a gap remains between each of the adjacent panels when they are assembled, and no gutters are provided beneath the gaps. Thus, the Davis panels are not at all waterproof and cannot be installed over a room or other space which must remain dry, unless considerable waterproofing (e.g., the installation of tarpaper, etc.) is accomplished beneath the panels. Moreover, Davis makes no suggestion for the use of the space between the upper and lower surfaces of his panels for the circulation of fluids therebetween or as conduits for any purpose, or for any means of connecting one or more conduits to such space between the two surfaces.

U.S. Pat. No. 5,758,467 issued on Jun. 2, 1998 to S. Clayton Snear et al., titled "Inter-Connectable Modular Deck Member," describes a deck construction formed of a series of extruded panels having configurations much like that of the panels of the Davis '184 U.S. patent, discussed immediately above. The Snear et al. panels have relatively wide and open gutters or channels disposed between each adjacent panel, rather than underlying the drainage area of the panels, as in the present invention. Moreover, Snear secures his panels to the underlying structure by means of screws or nails driven through the overlapping panel edges forming the floors of the gutters. This construction cannot provide a truly waterproof deck. As in the case of the panels of the Davis '184 U.S. patent, Snear makes no suggestion for the use of the space between the upper and lower surfaces of his panels for the circulation of fluids therebetween or as conduits for any purpose.

U.S. Pat. No. 5,765,328 issued on Jun. 16, 1998 to Grant M. Moore, titled "Drainage System For Decks," describes the installation of a series of plastic channels or gutters between the supporting joists of an overlying deck formed of spaced apart wood planks or boards. The plastic channels serve to capture any water and/or debris which passes through the gaps between the boards. The overlying deck boards are not extruded panels and do not interlock, nor do they have integral drainage channels or gutters formed therewith, as do the present extrusions. Moreover, the assembly does not form a series of closed, sealed spaces or passages therein, as do the extrusions of the present invention.

U.S. Pat. No. 5,797,237 issued on Aug. 25, 1998 to Donald R. Finkell, Jr., titled "Flooring System," describes flooring boards having a modified tongue and groove joint system. The base edge of each tongue includes a channel therein, with the distal edge of the mating extension which defines one side of the opposite groove having a lip which engages the channel along the tongue. This construction provides greater security for adjoining boards, but does not provide a completely watertight joint, as provided by the present invention. Also, the Finkell, Jr. flooring system is directed to wood boards; no disclosure is made of any form of extrusion, underlying drainage channels or gutters, or other key features of the present invention. The floor board assembly of Finkell, Jr. does not provide spaced apart upper and lower walls or plies defining a series of closed, sealed spaces or passages therein, as do the present watertight decking extrusions.

U.S. Pat. No. 5,816,010 issued on Oct. 6, 1998 to James H. Conn, titled "Interconnecting Construction Panels," describes a series of identical extruded panels having interlocking means at their adjoining edges. A first panel edge includes a channel with an overhanging lip extending over the channel and forming a trough, with the mating second panel edge having an inverted, U-shaped hook, the free end of which forms a "contact" that is inserted into the trough of the first panel edge, although loosely, since the trough has a greater width than the "contact". The opposite wall of the channel of the first panel extends upwardly to a level even with the underside of the first panel and is used as a fulcrum during assembly of the panels. Thus, when the panels are assembled, there is an interference equal to the panel thickness as the upper edge of the second panel is captured beneath the overhanging channel lip of the first panel, while the underside of the second panel bears against the upper edge of the freestanding channel wall of the first panel.

While the Conn patent shows various shapes for the extreme edge configurations of the second panel, no resilient sealing means are provided by Conn to positively seal the joint against moisture seepage therethrough. The principle of capillary action is well known, with a thin film of water tending to seep or "wick" along a surface in defiance of gravity, particularly over smoothly contoured surfaces such as the rounded edges of the Conn panels. Conn does nothing to prevent this with seals or other means employed by the present invention to form truly waterproof panel joints. In fact, due to the very high pressure developed by the edge of the second panel bearing against the underside of the first panel, any resilient sealing means applied between these two contact lines would be quickly worn away.

Moreover, Conn specifies that the joints between his panels are relatively loose, i.e., allow a fair amount of lateral play or motion. The present inventors' experience with the Conn panels shows that this lateral motion, along with the tight interference between adjacent panels, results in squeaks, groans, and other unpleasant noises being produced by the Conn panel joints as the "contact" of the second panel rubs and bears against the underside of the first panel in the trough. In contrast, the edges of the panels of the present invention form a series of variations of the tongue and groove principle, and do not require any other support to form a tight lock with one another. Moreover, this tongue and groove principle allows for the installation of resilient seals therein, if so desired, to provide further sealing against moisture seepage. Also, the present panels include a relatively sharp edged drip rail which is suspended within the channel of the adjoining panel. The sharp edge of the drip rail precludes capillary action or "wicking" of moisture around the edge, thereby assuring that any moisture which reaches this point will drop into the underlying channel. The drip rail provides an additional benefit by wedging itself against the opposite channel wall to preclude relative motion between the two joined panels. It is also noted that Conn does not provide a second, lower wall or surface opposite the upper surface to define a series of passages therebetween, as provided by the present extruded watertight decking panels.

U.S. Pat. No. 6,158,191 issued on Dec. 12, 2000 to Charles T. Seem, titled "Roof Panel With Plow-Shaped Edge And Related Panel System," describes a series of panels formed of foam plastic core material with a very thin sheet metal upper covering. Such panels cannot support any significant weight and must be supported by some underlying structure, as is clear from the drawings of the Seem roof panel system. Seem depends upon multiple areas of resilient foam material along the edges of adjoining panels, rather than providing for the interlock of adjacent panels and drainage gutters for any residual moisture which may pass through the seals, as in the case of the present watertight decking invention. Seem does not disclose a panel having opposed, spaced apart upper and lower walls or plies defining a series of passages therebetween.

U.S. Pat. No. 6,199,340 issued on Mar. 13, 2001 to Harry H. Davis, titled "Modular Construction Element," describes a closed box extruded structure with interconnecting edge components. The Davis '340 U.S. patent is a continuation-in-part of the '184 U.S. patent to Davis, discussed further above. The primary difference between the extrusions of the two Davis patents appears to be the rectangular edges of the extrusion of the later '340 patent, as compared to the trapezoidal edges of the extrusion of the earlier '184 patent discussed further above. The same points raised in the discussion of the earlier '184 U.S. patent to Davis are seen to apply here as well, particularly insofar as the lack of a completely watertight joint and the need for additional waterproofing for the Davis extrusions is concerned, as well as the lack of provision for using the passages as conduits and any means for connecting other conduits to the passages of the extrusions.

U.S. Pat. No. 6,324,796 issued on Dec. 4, 2001 to Randall N. Heath, titled "Modular Decking Planks," describes another box structure extrusion having interlocking edges between adjacent panels. A downwardly extending male box structure locks into a mating upwardly facing channel in the adjacent panel, to join two panels together. This is not a completely watertight structure, as water can seep downwardly into the upwardly facing channels, and the channels include nail or other fastener holes in their bottom components. In contrast, the channels of the present extruded panels are unbroken, with fasteners being secured through a flange which extends externally from each channel. Moreover, Heath does not disclose the use of the interior of his planks as conduits for fluids or for other purposes, and does not disclose any means for connecting external conduits to such passages.

U.S. Pat. No. 6,427,395 issued on Aug. 6, 2002 to Glenn R. Elsasser et al., titled "Elongated Covering Member Of Extruded Plastic Suitable For Flooring, Decking, Seating, And Like Uses," describes various embodiments of an extrusion having opposed channels with open tops along each edge. Fasteners are driven through the floors of the channels, and the channels are covered with a plastic overlay which snaps or catches in place over the base extrusion, or into the channels. The Elsasser et al. extrusions are particularly directed to use as covers for wood stadium seating or the like. Elsasser et al. note that their extrusions may be used for roof decking or the like, but they fail to provide any means of interconnecting adjacent extrusion components to provide any sort of watertight (or other) joint between them. Thus, water and foreign matter can easily pass between adjacent panels of the Elsasser et al. extrusions. While Elsasser et al. provide a component having closed channels or passages therethrough, the passages do not extend in a substantially laterally continuous array as in the present panels. Moreover, Elsasser et al. do not disclose any means of connecting one or more external conduits to their passages.

Finally, Japanese Patent Publication No. 6-108,589 published on Apr. 19, 1994, titled "Gutter-Built-In Roof Panel," describes (according to the drawings and English abstract) a composite panel having a series of ribs or support members therein that is overlaid with sheet material. The English abstract refers to "vertical gutters," by which it appears that they mean the sloped eaves of a gabled roof. The panels are laterally symmetrical, with no direct tongue-and-groove interconnection, as provided by the present extruded panels. While the assembly forms a series of passages across the interiors of the panels, the passages are enclosed at their ends with no means for allowing fluids to flow therethrough.

None of the above inventions and patents, taken either singly or in combination, is seen to describe the instant invention as claimed. Thus, watertight decking solving the aforementioned problems is desired.

SUMMARY OF THE INVENTION

The present invention comprises several embodiments of rigid structural extrusions which form watertight decking when assembled together. The extruded panels of the present invention may be divided into three general types, comprising first side panels, opposite second side panels, and central panels which may be assembled between the first and second side panels. The first side and central panels include gutters formed integrally therewith and either a tongue or a groove formed along the gutter edge for engaging a mating tongue or groove along the adjoining edge of the adjacent panel. The second side and central panels also include mating edges which engage the corresponding edges of the adjacent panel along the gutter edge.

The second side and central panels also include depending drip rails, which extend downwardly into the gutter of the adjoining panel. These drip rails serve two functions: (1) they prevent capillary flow or "wicking" of any moisture which seeps through the joints between panels from flowing along the underside of the panel and past the opposite gutter wall to drip into the underlying room or area, and (2) the drip rails are spaced to produce a wedging fit against the gutter wall edge of the adjoining panel, forcing the tongue and groove joint tightly together. The gutter wall against which the drip rail bears is preferably somewhat shorter than the underside of the adjoining panel installed thereover, in order to prevent noise from contact between the gutter wall and the overlying panel when the assembly is walked upon and flexed slightly.

Additional sealing may be provided in the form of a resilient seal disposed within the groove of the tongue and groove joints between the panels, in order to further insure against moisture penetration through the panel assembly. Also, the depending drip rail may have a bead formed along the channel wall contact surface thereof, which engages a groove formed in the channel wall. This provides an even more secure assembly for the present panels, locking them together and assuring that they cannot separate from one another. The present panels may be used in the construction of docks and other maritime structures, but are also well suited for deck and similar roof construction due to their rigidity, strength, and resistance to water penetration.

The panels may include opposed upper and lower walls, with the opposed walls and connecting structure defining a series of passages extending through each panel between the walls. Additional circular (or other cross sectional shape) conduits may be formed between the walls as desired for conducting heating or cooling fluids through the panels, for routing electrical or other conductors through the panels, etc. Moreover, the second, lower wall provides a finished appearance for the undersides of the panels when they are used as a combination roof and ceiling structure over an enclosed area, as well as providing additional strength for the panels.

These and other features of the present invention will become readily apparent upon further review of the following specification and drawings.

BRIEF DESCRIPTION OF THE DRAWINGS

FIG. 23 is an end elevation view in section of two panels comprising a fifteenth embodiment, wherein the tongue and groove panel edges are reversed from the thirteenth and fourteenth embodiments.

Similar reference characters denote corresponding features consistently throughout the attached drawings.

DETAILED DESCRIPTION OF THE PREFERRED EMBODIMENTS

The present invention comprises a series of embodiments of rigid, load-bearing, extruded panels which form a watertight deck when assembled together. The panels each include some means of positively locking to one another to form a leakproof seal, and include channels for draining any moisture which might seep through an imperfect seal.

Figure 1:
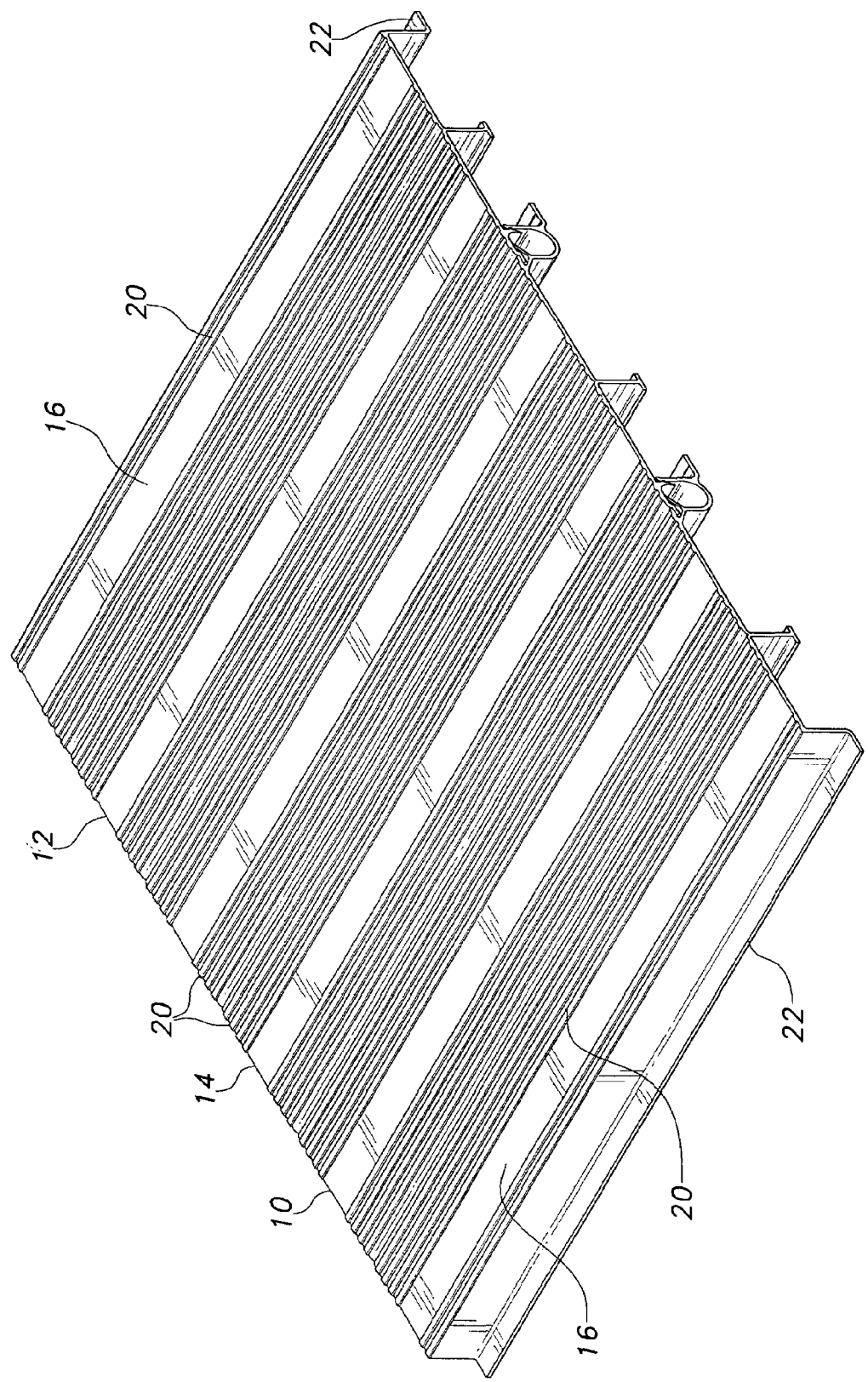
FIG. 1 is a perspective view of an assembled series of panels comprising a first embodiment of the watertight decking of the present invention, showing the general configuration of the decking.

FIG. 1 of the drawings provides a perspective view of a panel assembly formed of a series of first embodiment panels, comprising a first end panel 10, a second end panel 12, and an intermediate panel 14. Each of the panels 10 through 14 includes a single wall or ply having a generally flat, planar upper surface 16 and an opposite lower or bottom surface 18 (shown in FIG. 3). The upper surface may be provided with ribs 20 (or other raised or recessed pattern) to provide more secure traction when walking on a deck formed of the present panels. The first and second end panels 10 and 12 each include finished, flanged outboard edges 22, which are not configured to attach to other panels of the present invention. However, the first end panel 10 and intermediate panel 14 each have first attachment edges which positively interlock with the mating second attachment edges of second end panel 12 and other intermediate panels 14 (not shown).

Figure 2:
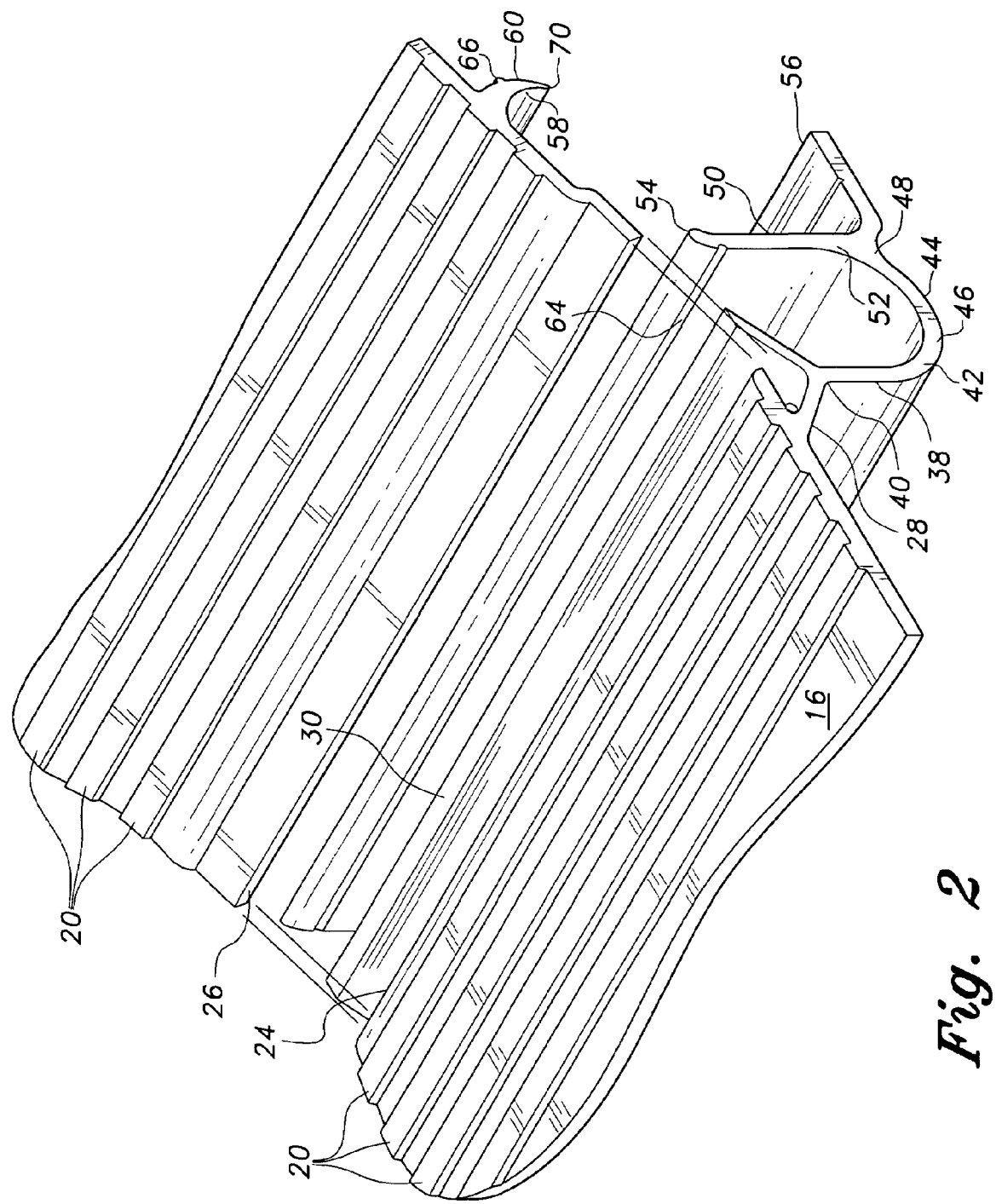
FIG. 2 is a broken away, exploded perspective view of the channel edge of a first panel and the mating edge of a second panel, showing assembly of two panels of the FIG. 1 embodiment.
Figure 3:
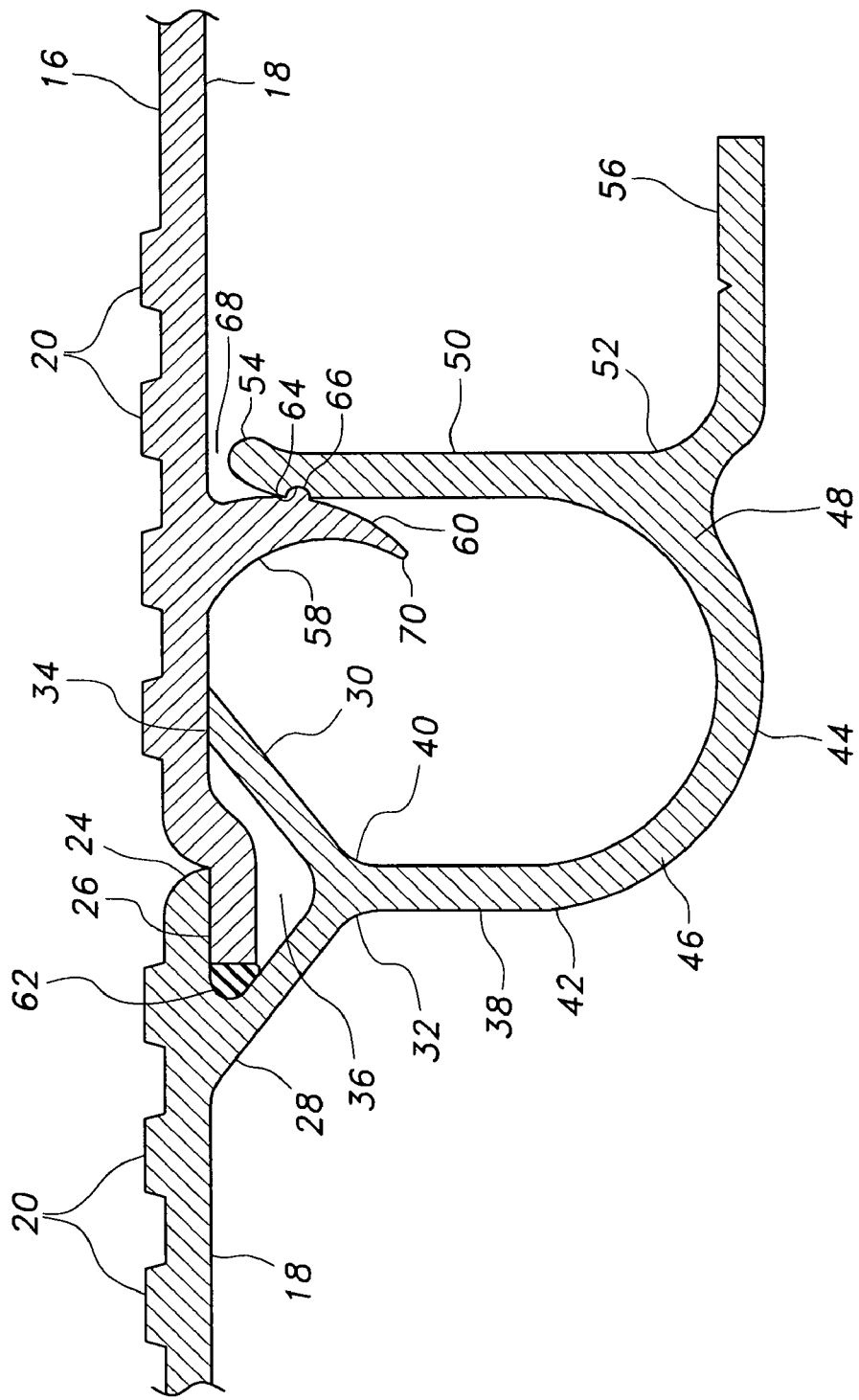
FIG. 3 is an end elevation view in section of two panels of the embodiment of FIGS. 1 and 2, showing their fit when assembled together.

FIGS. 2 and 3 respectively provide exploded perspective and end views in section of a first and second attachment edge, respectively 24 and 26, of the watertight panels of the present invention. FIG. 3 provides a detailed end elevation view in section of all of the edge attachment components. In the embodiment of FIGS. 1 through 3, a channel support leg 28 slopes away from the bottom surface 18 and extends therebelow, with its base or root set back from the first attachment edge 24. An adjacent panel fulcrum flange 30 slopes upwardly from the lower edge 32 of the channel support leg 28, i.e., toward the plane of the panels 10 through 14 when they are assembled together. The distal edge 34 of the panel fulcrum flange 30 bears against the underside 18 of the adjacent panel and acts as a fulcrum 34 to wedge the adjacent panels securely together when multiple panels are assembled together. The first attachment edge 24, channel support leg 28, and panel fulcrum flange 30 combine to define an adjacent attachment edge groove 36 in which the adjacent second attachment edge or tongue 26 seats when the panels are assembled. The specific arrangement of the tongue and groove components may be reversed in this or other embodiments, as desired.

The channel support leg lower edge 32 has a channel first wall 38 depending therefrom, with the channel first wall 38 having an upper or panel attachment edge 40 and an opposite lower edge 42. A freestanding channel second wall 50 has a lower edge 52 which connects to the lower edge 42 of the channel first wall 38, e.g., by means of a channel floor 44, or more directly, as shown in at least one of the alternative embodiments of FIG. 5. In the case of the embodiment of FIGS. 1 through 3, the curved channel floor 44 includes opposite first and second wall edges 46 and 48, which join with the respective lower edges 42 and 52 of the two channel walls 38 and 50. The channel floor 44 may be curved to form a generally U-shaped channel as shown in FIGS. 1 through 3, or may have a flat, V, or other configuration as desired. The channel second wall 50 is spaced apart and generally parallel to the channel first wall 38 and extends upwardly to its upper edge 54, which is spaced apart from the channel first wall 38 by the width of the channel floor 44. An attachment flange 56 extends outwardly from the juncture of the second wall edge 48 of the channel floor 44 and the lower edge 52 of the channel second wall 50 and generally coplanar with the channel floor 44, and serves as a plate through which fasteners (nails, screws, etc.) may be driven to secure the present panels to an underlying structure.

It will be noted that the structure described thus far does not include any independent means (adhesive, etc.) for positively locking the offset tongue 28 of the second end or intermediate panels 12 and 14 into the groove 36 of an adjoining intermediate panel 14 or first end panel 10. The present extruded decking panels provide for such positive locking through the interlocking shapes of the tongue and groove when flanges 22 and 56 are secured to a supporting structure in order to preclude relative movement between panels, together with the locking means described immediately below.

FIGS. 2 and 3 illustrate such positive locking means to preclude relative movement between panels. It will be noted that the second end panel 12 and intermediate panels 14 each have a drip rail 58 extending downwardly from the lower surface 18 thereof, which is spaced apart from the second attachment edges or tongues 26 of these panels 12 and 14 by a distance about equal to the span between the two channel walls 38 and 50. The drip rail 58 preferably has an arcuately convex contact surface 60 abutting the interior of the channel second wall 50, the arcuate shape of the drip rail 58 producing a cam-like action to smoothly increase the sealing pressure and wedge the panel second attachment edge or tongue 26 tightly within the groove 36 beneath the opposite panel first attachment edge 24 as the panel second attachment edge 26 is rotated into place along the opposite panel first attachment edge 24. The completed assembly is most clearly shown in FIG. 3 of the drawings. Additional sealing against moisture may be provided by installing a bead of resilient and/or adhesive material 62 within the grooves 30 of the panel second attachment edges 26 to provide an even better seal, as shown in FIG. 3.

The primary means for securing each of the present panels together is by the installation of fasteners through the attachment flanges 56 and/or the outboard edge flanges 22, depending upon the specific panel. However, some additional security may be provided by locking the drip rail 58 to the adjacent channel second wall 50 with which it is in contact. This also serves to prevent relative motion and noise between the drip rail 58 and the channel second wall 50 against which the drip rail 58 bears tightly.

It will be noted in FIGS. 2 and 3 that a locking groove 64 is provided along the channel second wall 50 on the surface facing the drip rail 58, with a mating locking bead 66 protruding from the channel second wall contact surface 60 of the drip rail 58. The panels are assembled by placing the second panel offset attachment edge or tongue 26 of one panel within the slot or groove 36 adjacent the first attachment edge 24 of a mating panel, and rotating the panel with the second attachment edge 26 downwardly about the pivot line defined by the distal fulcrum edge 34 of the adjacent panel fulcrum flange 30 which extends below the panel first attachment edge 24 where it contacts the underside 18 of the opposite panel.

As the second panel 12 or 14 is rotated into position with the opposite first panel 10 or 12 of the assembly, the drip rail 58 extends downwardly between the two channel walls 38 and 50 and bears against the inner surface of the channel second wall 50 to wedge the tongue 26 of the second panel tightly within the groove 36 of the first panel, as described further above. The drip rail 58 is locked in place relative to the channel second wall 50 by means of the locking bead 66 of the drip rail 58 snapping into place in the locking groove 64 of the channel second wall 50, to provide a more secure assembly and also to preclude relative movement and resulting noise between the drip rail 58 and the channel second wall 50.

FIG. 3 illustrates a gap 68 between the upper edge 54 of the channel second wall 50 and the underside 18 of the mating panel, due to the upper edge 54 of the channel second wall being non-coplanar with the lower surface(s) 18 of the panel(s). This allows flexure of the panels to occur when weight is applied thereto, without allowing the panel having the drip rail 58 to flex sufficiently for its lower surface 18 to contact the upper edge 54 of the channel second wall of the opposite panel. The primary benefit of this is to reduce noise in the panel assembly, when weight is applied to the panels. The locking groove 64 of the channel second wall 50 and mating locking bead 66 of the drip rail 58 also assist in precluding relative movement of the overlying panel and the underlying channel second wall 50.

The drip rail 58 provides another benefit, as a last chance stop for any moisture that may seep through a defective seal at the tongue and groove assembly of the first and second attachment edges 24 and 26 of the two joined panels. In other panels, moisture which seeps through such a defective joint will creep along the underside of the panel(s) until it amasses sufficiently to drip from the panel underside. It has been found that a miniscule amount of moisture will flow around a rounded contour due to surface tension and capillary action, and flow back up a moisture barrier having smoothly rounded contours. On the other hand, providing the moisture barrier, e.g., the drip rail 58 of the present panel assembly, with a relatively sharp lower edge 70, causes the moisture to gather along that edge 70 and drip into the underlying channel where it can be drained off.

Figure 4:
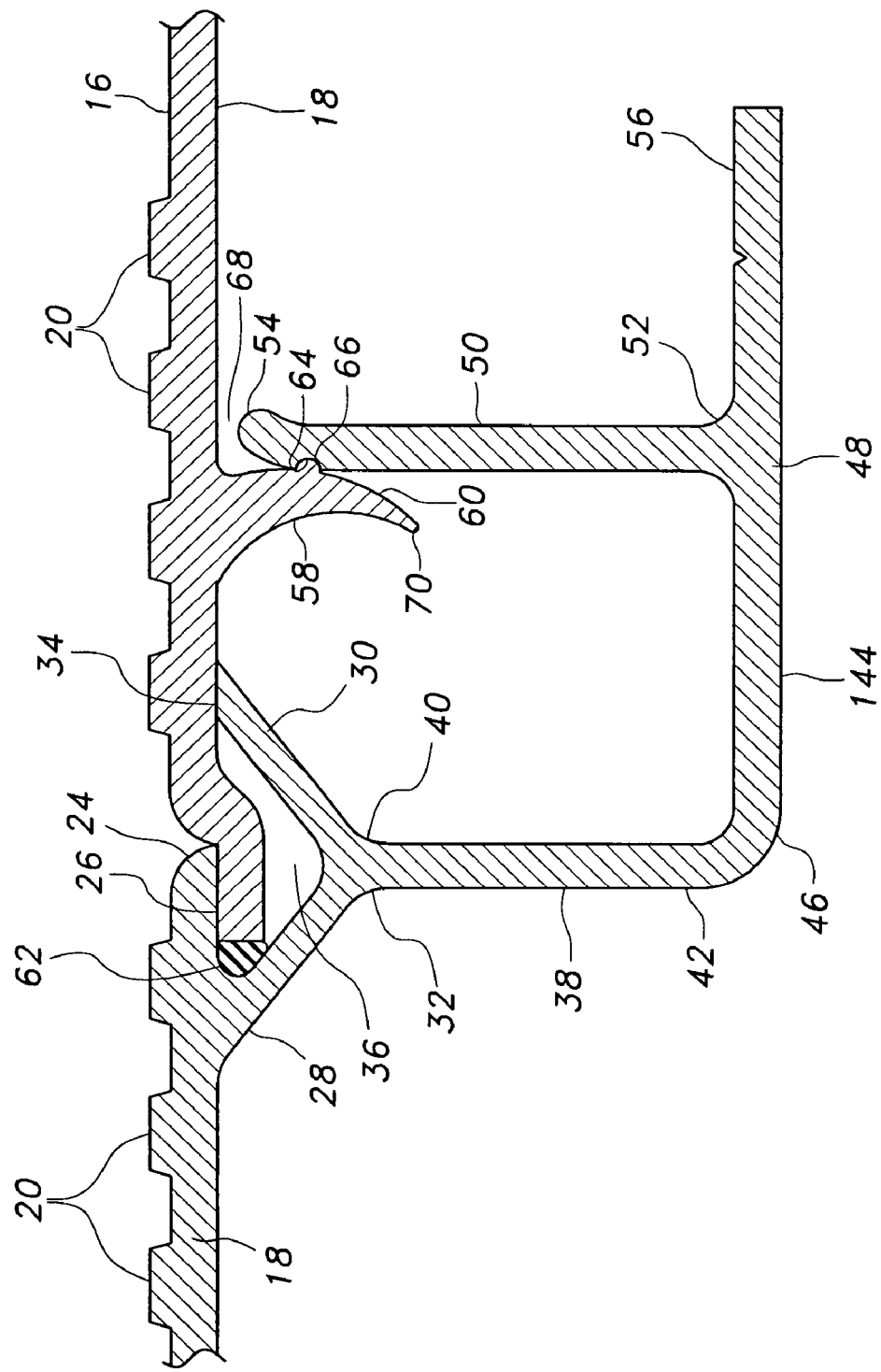
FIG. 4 is an end elevation view in section of two panels comprising a second embodiment, having a square or rectangular channel configuration.

FIG. 4 illustrates a second embodiment of the present watertight decking invention, wherein the channel floor 144 is flat and forms a continuous and unbroken flat plane with the attachment flange 56. The channel walls 38 and 50 and the flat channel floor 144 of the FIG. 4 embodiment thus define a generally rectangular channel shape, rather than the U-shaped channel of the embodiment of FIGS. 1 through 3. Other components, e.g., the tongue 26, mating groove 36, drip rail 58 with its locking bead 66 and the mating locking groove 64 of the channel second wall 50, etc., are identical to those components described further above for the first embodiment of FIGS. 1 through 3. However, the specific channel shape is not critical to the inventive concept of the present watertight decking embodiments.

Figure 5:
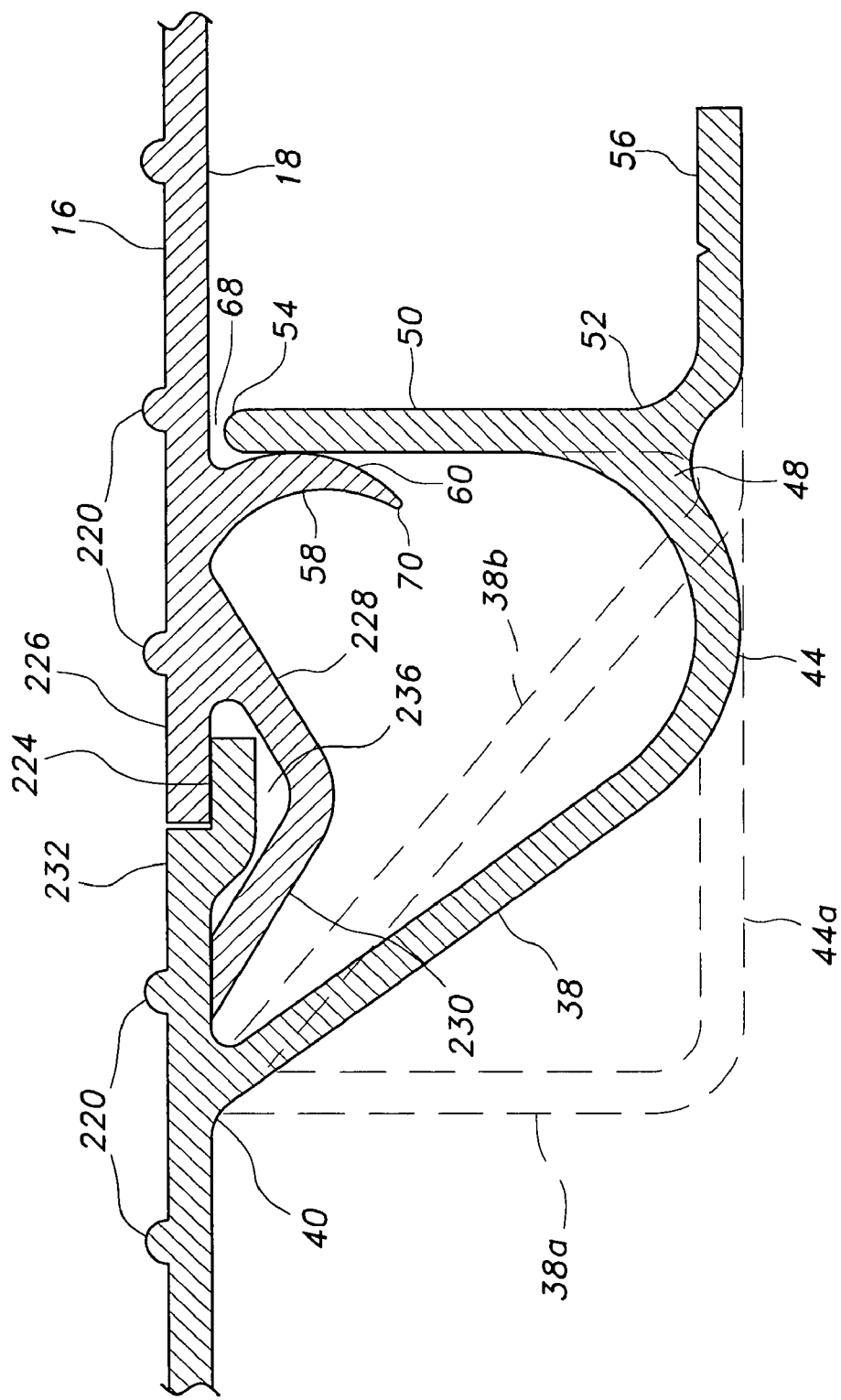
FIG. 5 is an end elevation view in section of two panels comprising a third embodiment, wherein the tongue and groove panel edges are reversed from the first two embodiments.

FIG. 5 provides an illustration of yet another embodiment of the present watertight decking invention. The primary embodiment of FIG. 5 most closely resembles the embodiment of FIGS. 1 through 3 with its rounded channel floor 44, but differs primarily in that the first and second tongue and groove components are reversed from their relative locations in the embodiments of FIGS. 1 through 4. In FIG. 5, the offset tongue 224 extends from the first attachment edge 232 of a first end or intermediate panel, while the mating groove 236 extends generally from the second attachment edge 226 of a second end or intermediate panel.

The groove 236 of the embodiment of FIG. 5 is defined by a fulcrum base or first leg 228 which slopes away from the overlying second attachment edge 226, with a fulcrum extension 230 extending from the fulcrum leg 228 and angled back toward the underlying surface behind the first attachment edge 224 of the adjacent panel when two panels are assembled together. The assembly is essentially reversed from the embodiments of FIGS. 1 through 4, with the offset tongue 224 of the panel first attachment edge 232 being inserted into the groove 236 of the panel second attachment edge 226.

In the embodiment of FIG. 5, the upper edge 40 of the channel first wall 38 extends angularly toward the base 52 of the second channel wall 50, rather than being substantially parallel to the second channel wall. This serves to narrow the base or floor 44 of the channel, as the upper ends or edges 40 and 54 of the two channel walls must be spread relatively widely in order to provide clearance for the attachment configuration in this embodiment. Alternatively, the first channel wall could extend generally normal to the plane of the first or intermediate panel, as shown by the alternative channel wall 38*a*, with a relatively wide channel floor 44*a* extending between the bases of the two channel walls 38*a* and 50. Another alternative is shown as channel wall 38*b* in broken lines, wherein the channel wall forms a slope with its lower end meeting directly with the lower edge 52 of the second channel wall 50. The specific shape or configuration of the channel is not particularly critical, so long as it serves to contain and channel any runoff which may seep through the panel joint thereabove.

The panel joint embodiment of FIG. 5 may have other differences from the embodiments of FIGS. 1 through 4 as well, e.g., a different shape for the ribs 220 (or other traction enhancing means) on the upper surface(s) 16, the omission of the locking bead 66 along the channel wall contact face of the drip rail 58 and corresponding omission of the locking groove 64 along the inner surface of the channel wall 50, etc. These various features may be installed or omitted on any of the embodiments of the present watertight decking panels, as desired. Those components of the embodiment of FIG. 5 that are essentially identical to those corresponding components of the embodiments of FIGS. 1 through 4 are indicated by the same numbers used to identify those components in the other drawings.

Figure 6:
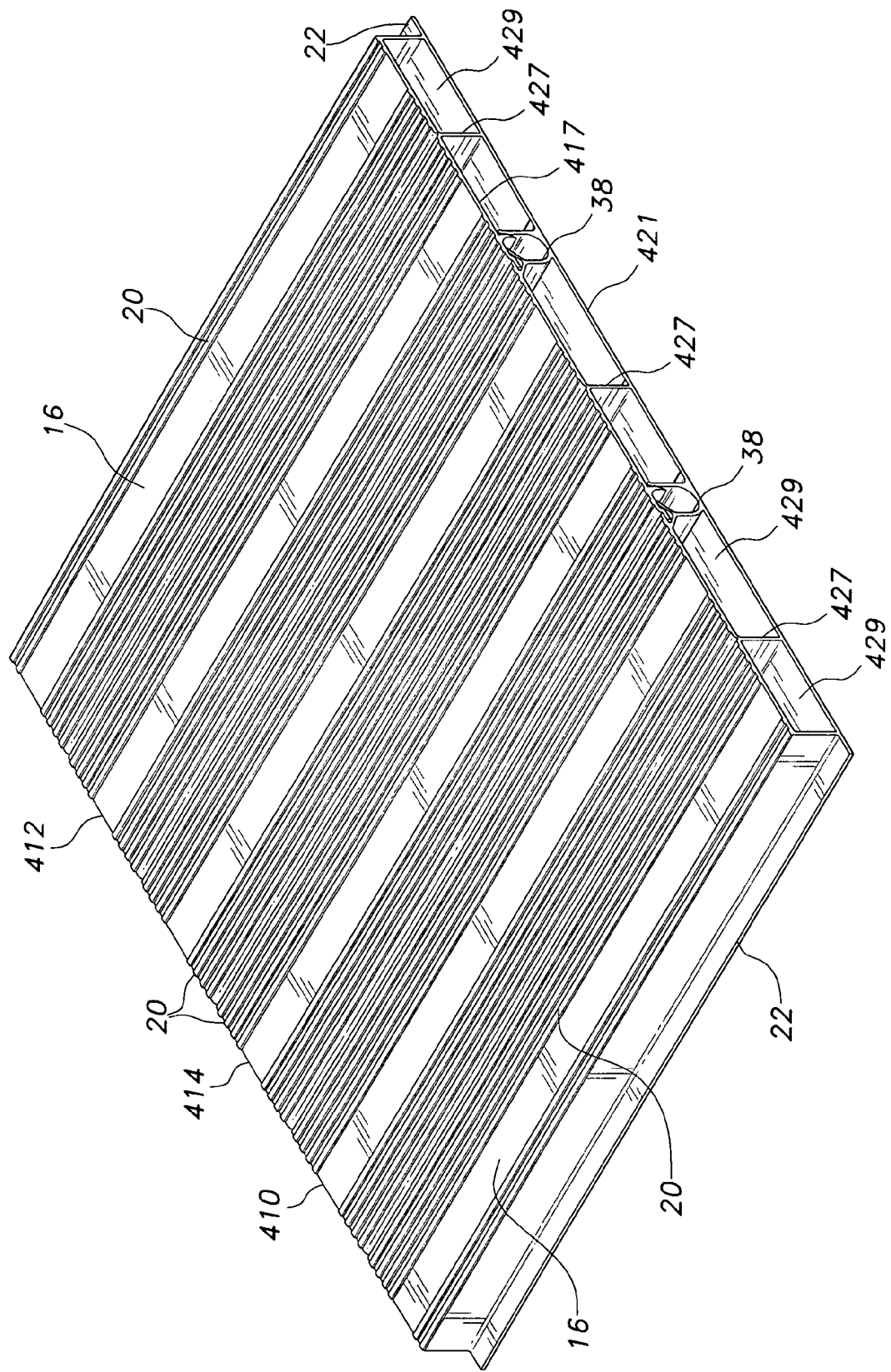
FIG. 6 is a perspective view of an assembled series of panels comprising a fourth embodiment of the watertight decking of the present invention having a second wall or ply opposite the first wall, showing the general configuration of the decking.
Figure 7:
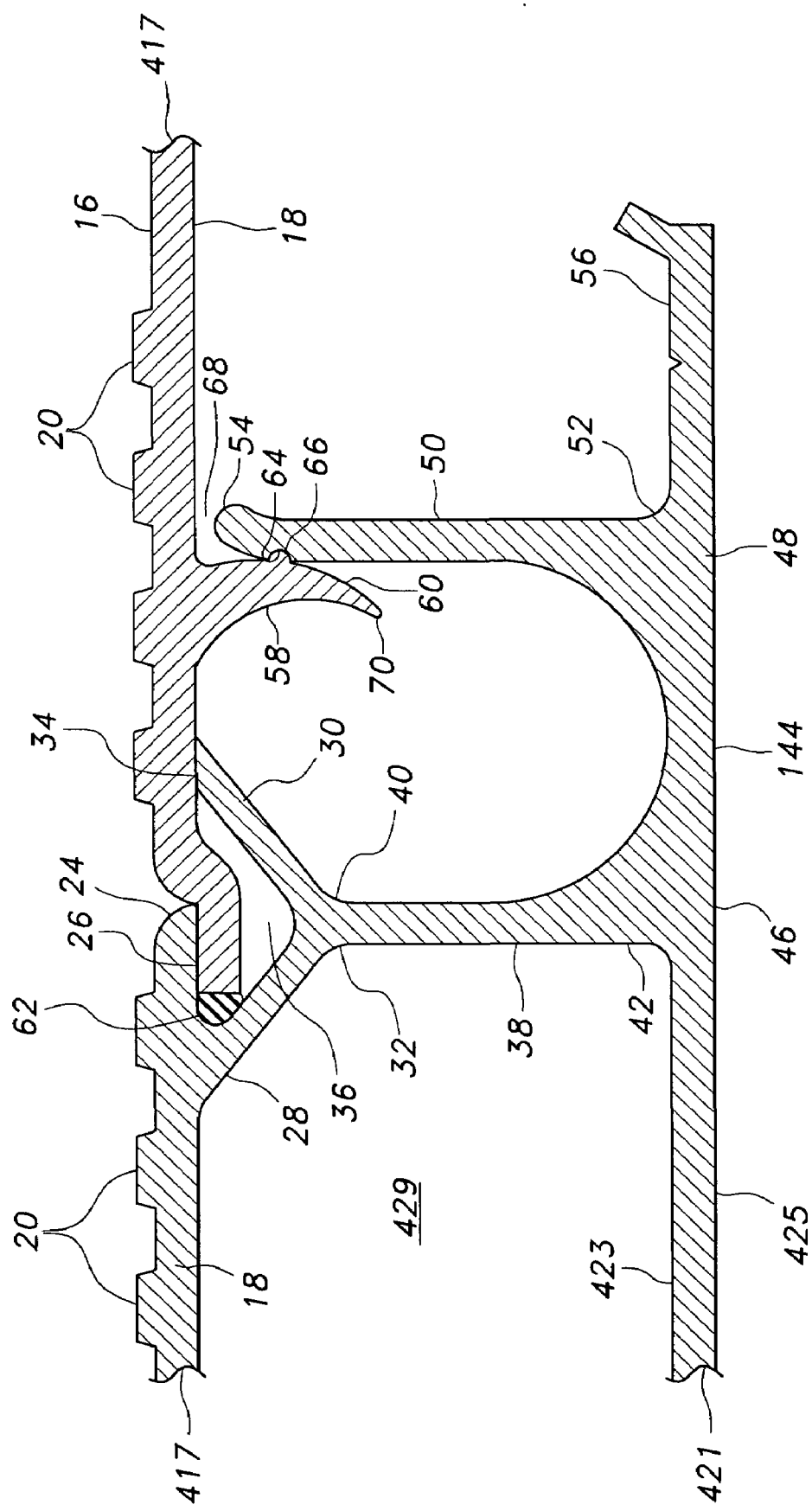
FIG. 7 is an end elevation view in section of two panels of the embodiment of FIG. 6, showing their fit when assembled together.

FIGS. 6 and 7 illustrate a fourth embodiment of the present watertight decking panels, comprising a first end panel 410, an opposite second end panel 412, and an intermediate panel 414. Those elements of the panels 410 through 414 which are identical to the first embodiment panels are numbered identically, e.g. the upper surface 16, ribs 20 of the upper surface, outboard edge flanges 22, etc. However, the panels 410 through 414 differ from the panels 10 through 14 primarily in the two opposed walls of the panels 410 through 414. These panels 410 through 414 each include an upper or top wall 417, with the upper and lower surfaces 16 and 18 defining the thickness thereof, and an opposite lower or bottom wall 421 having an upper surface 423 and lower surface 425 defining the thickness thereof. The upper and lower walls 417 and 421 are connected by a series of interconnecting elements or webs 427 extending therebetween, with the two walls 417 and 421 and their interconnecting elements 427 defining a series of conduits or passages 429 which extend through the length of each extruded panel.

While the first walls 38 of the channels extend between the upper and lower walls 417 and 421, as shown in FIG. 7, it will be noted that the channel first walls 38 are different from the interconnecting elements 427, as the channel first walls 38 do not define completely closed conduits 429 or passages to both sides thereof when the panels are disassembled. However, the channel first walls 38 (together with their corresponding channel support legs 28) do extend from the lower surface 18 of the upper wall 417 to the upper or inner surface 423 of the lower or bottom wall 421, thereby closing off the adjacent duct or conduit 429. The opposite channel side or surface of the channel first wall 38 is open, however, until two mating panels are joined together.

As in the first through third embodiments of FIGS. 1 through 5, the channels of the double walled embodiments may have innumerable different configurations. The fourth embodiment of FIGS. 6 and 7 illustrates one such embodiment, in which the inner floor or surface of the channel has an arcuate, semicircular cross sectional shape. The external channel floor 144 is flat and coplanar with the external or lower surface 425 of the second or lower wall 421, thereby forming a smooth and continuous lower external surface for the double walled panels 410 through 412 when assembled together. The attachment flange 56 of the embodiment of FIGS. 6 and 7 abuts the adjacent edge of the lower floor 421 of the adjoining panel when assembled therewith.

Figure 8:
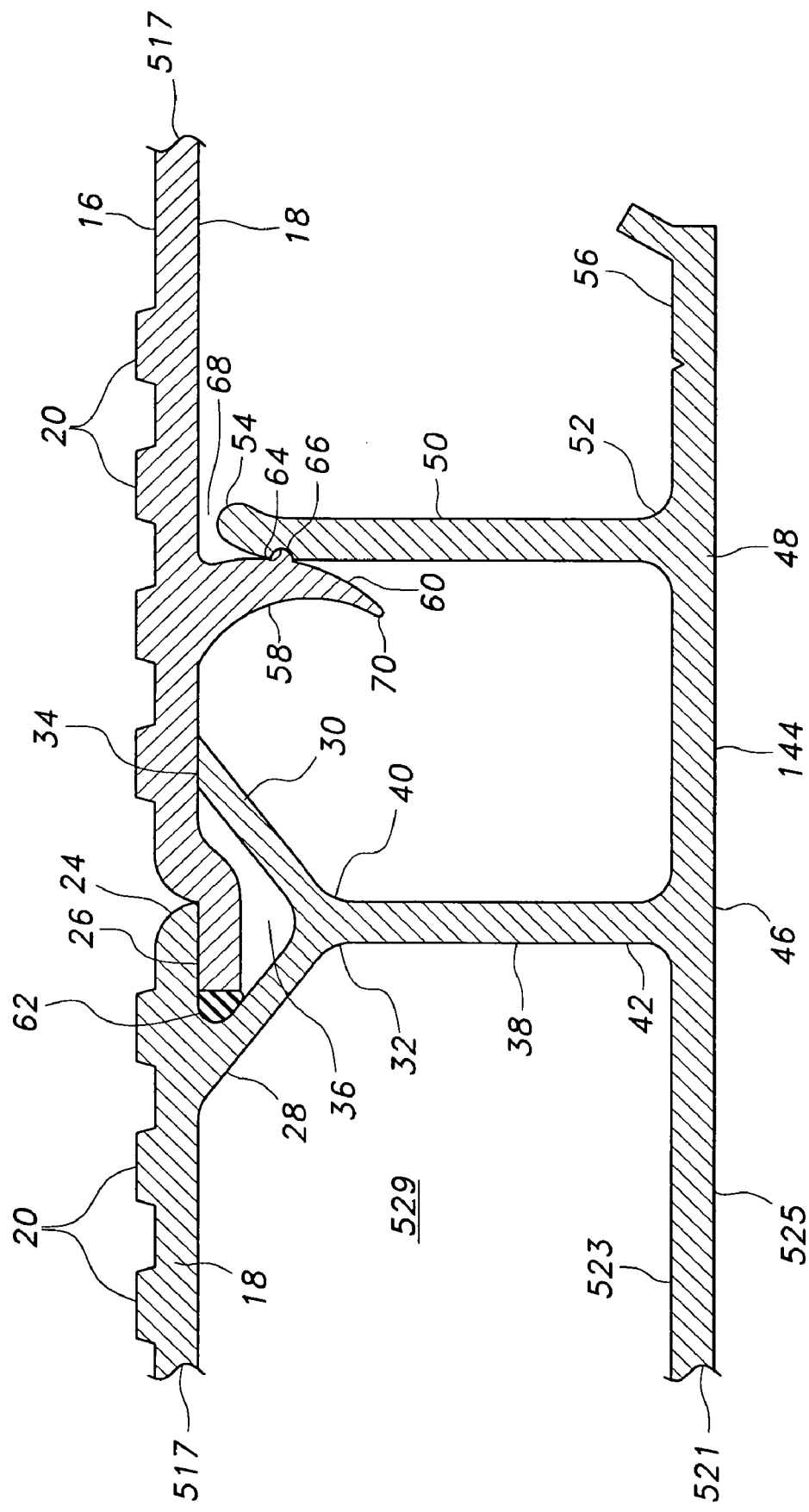
FIG. 8 is an end elevation view in section of two panels comprising a fifth embodiment, having a square or rectangular channel configuration.

FIG. 8 illustrates a cross section of a fifth embodiment of the present watertight decking panels, with the two walls thereof designated as upper wall 517 and opposite lower wall 521. The fifth embodiment panels differ from those of the fourth embodiment only in the internal shape of the channel, with the channel having a flat internal floor and generally squared internal corners. Otherwise, the structure of the fifth embodiment panels of FIG. 8 is substantially identical to the structure of the fourth embodiment panels of FIGS. 6 and 7.

Figure 9:
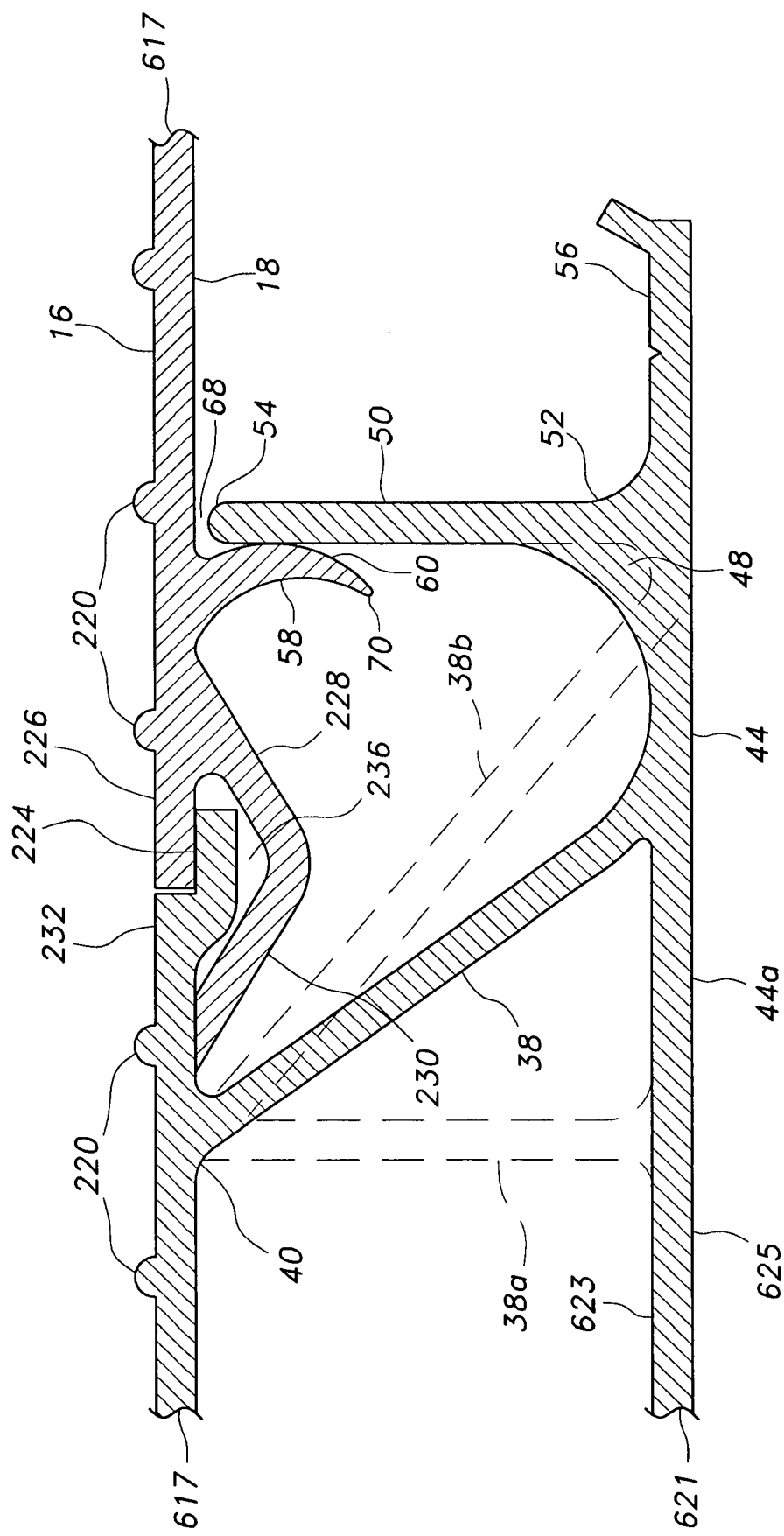
FIG. 9 is an end elevation view in section of two panels comprising a sixth embodiment, wherein the tongue and groove panel edges are reversed from the fourth and fifth embodiments.

FIG. 9 illustrates a cross section of a sixth embodiment of the watertight decking panels, with the panels of FIG. 9 having upper walls 617 and opposite lower walls 621. It will be noted that the sixth embodiment of FIG. 9 is similar to the third embodiment of FIG. 5, in that the drawings of the embodiments of FIGS. 5 and 9 illustrate common alternative wall configurations 38, 38a, 38b for the channel, as well as an alternative tongue and groove joint assembly common to both of the embodiments of FIGS. 5 and 9. However, it will be noted that the panel embodiment of FIG. 9 includes a continuous, solid lower wall 621, with its opposite surfaces 623 and 625, in keeping with the continuous, solid lower walls of all of the panel embodiments following those of FIGS. 1 through 5.

Figure 10:
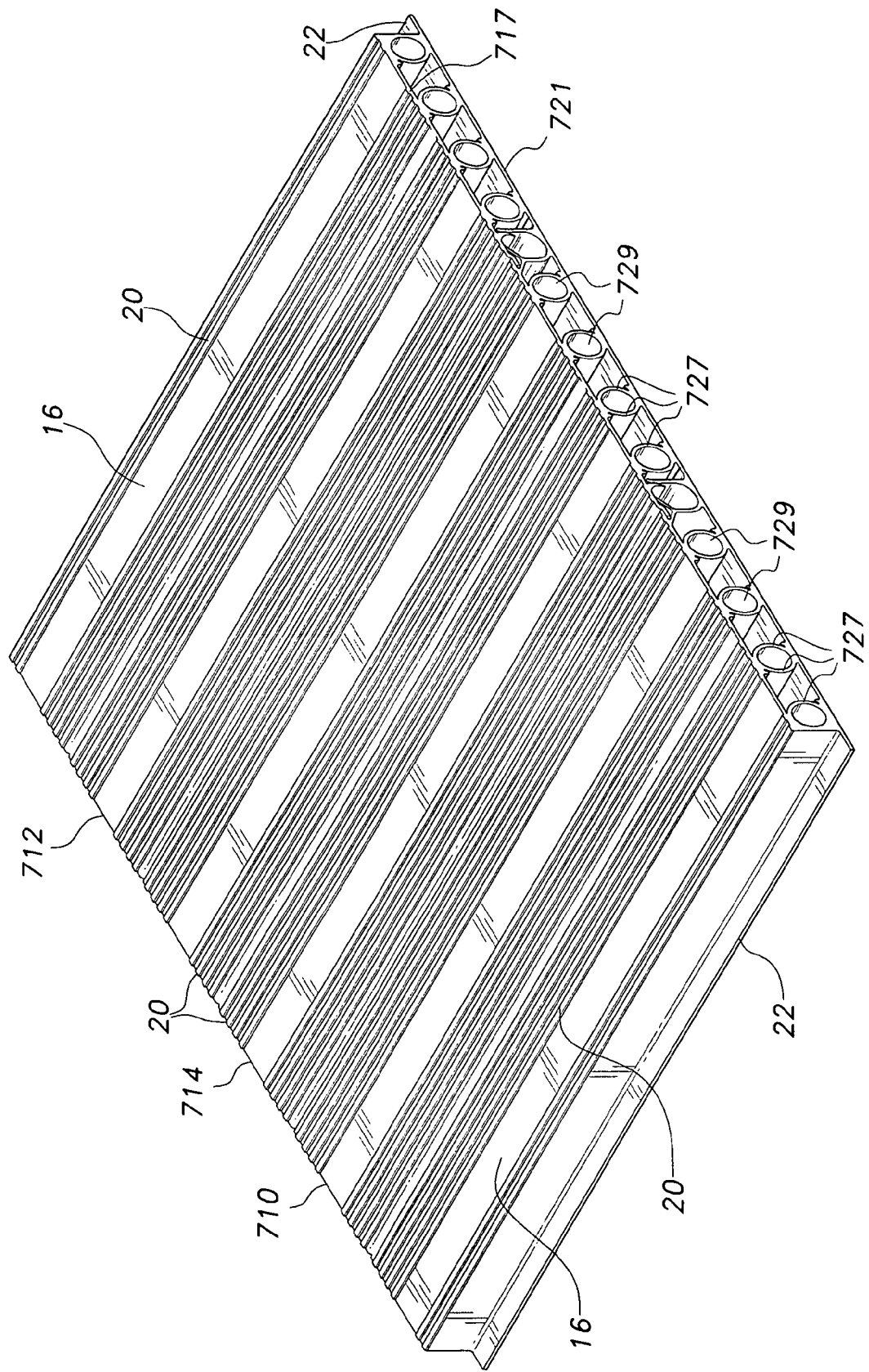
FIG. 10 is a perspective view of an assembled series of panels comprising a seventh embodiment of the watertight decking of the present invention having a series of conduits between the first and second walls, showing the general configuration of the decking.
Figure 11:
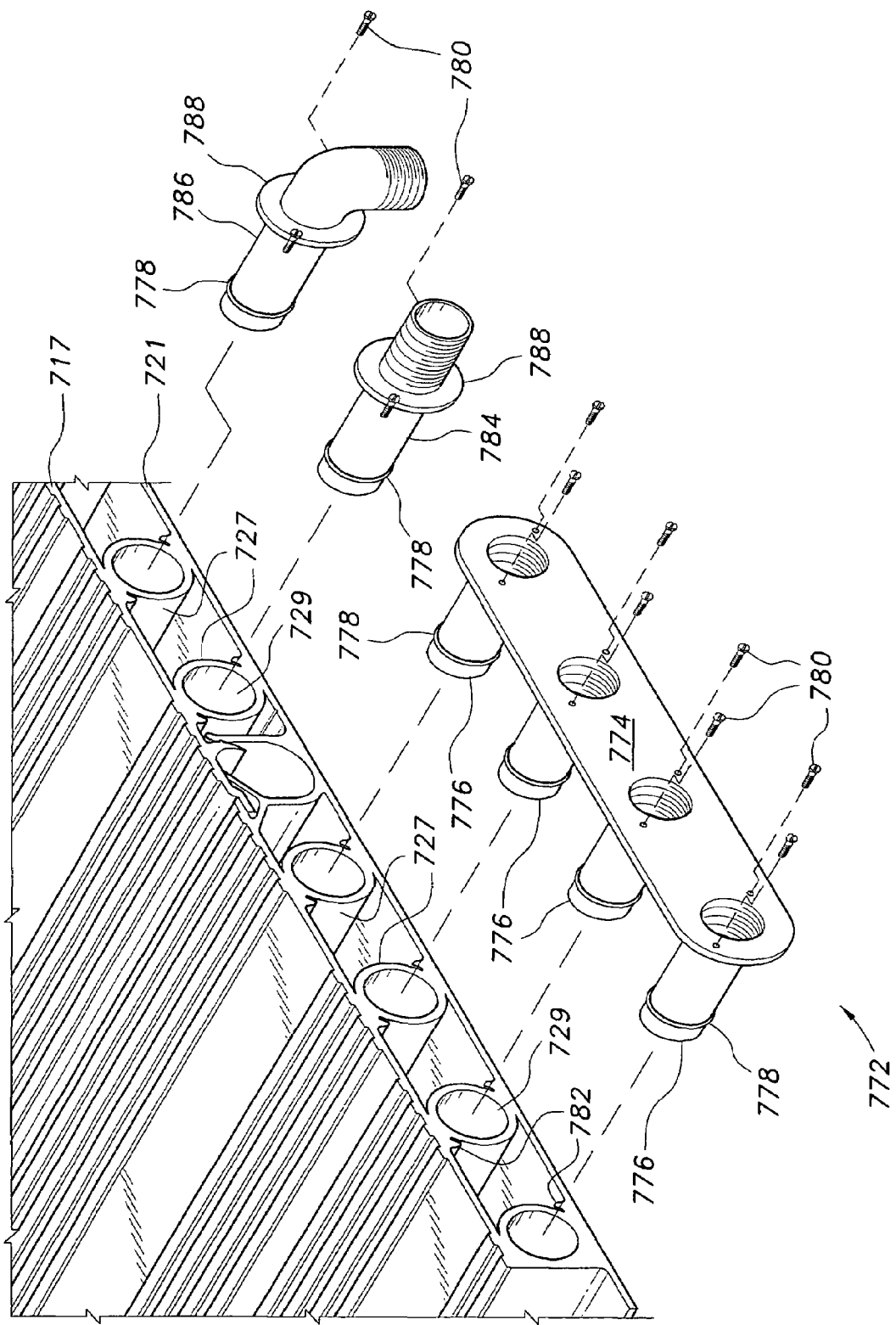
FIG. 11 is a broken away, exploded perspective view of the panel assembly of FIG. 10, showing the optional installation of a manifold and single conduits thereto.
Figure 12:
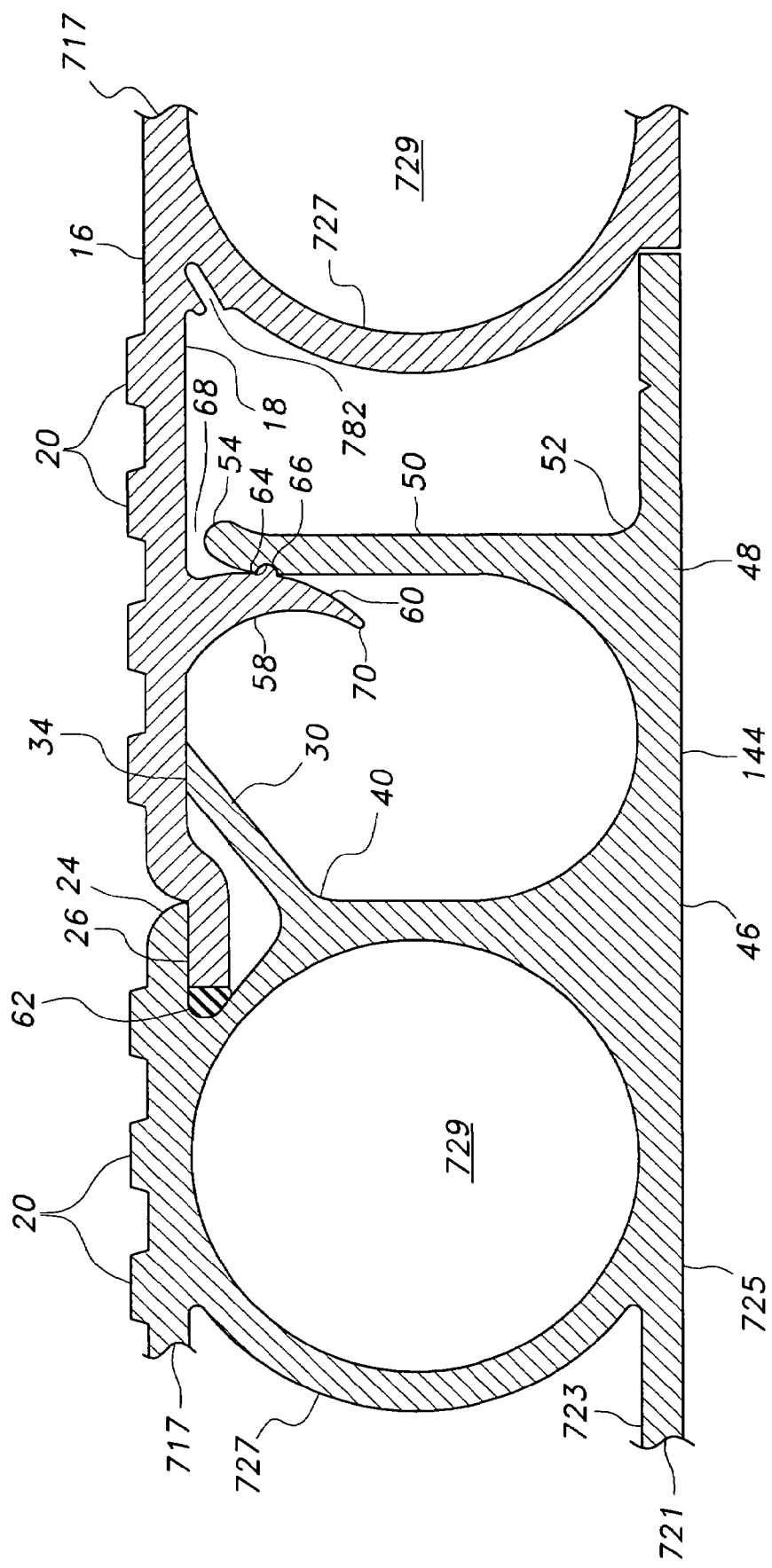
FIG. 12 is an end elevation view in section of two panels of the embodiment of FIG. 10, showing their fit when assembled together.

FIGS. 10 through 12 illustrate a seventh embodiment of the present watertight decking panels, comprising a first end panel 710, an opposite second end panel 712, and an intermediate panel 714. The panels 710 through 714 of FIGS. 10 through 12 are similar to the panels 410 through 414 of FIGS. 6 and 7, in that both embodiments include an upper or top wall, respectively 417 and 717, with the upper and lower surfaces 16 and 18 defining the thickness thereof, and an opposite lower or bottom wall 421, 721 having an upper surface 423, 723 and lower surface 425, 725 defining the thickness thereof. Those elements of the panels 710 through 714 which are identical to the first embodiment panels are numbered identically, e.g. the upper surface 16, ribs 20 of the upper surface, outboard edge flanges 22, etc. However, the panels 710 through 714 differ from the panels 410 through 414 of FIGS. 6 and 7, due to the semicircular interconnecting elements 727 extending between the two walls 717 and 721. Adjacent interconnecting element 727 pairs are arranged in mirror image to one another, thereby defining a series of circular conduits or passages 729 between each facing interconnecting element, with the conduits or passages 729 extending through the length of each extruded panel.

The seventh embodiment panels of FIGS. 10 through 12 are configured particularly well for providing passage of various fluids for heating or cooling the panels, or for other purposes as desired. Accordingly, one or more pipe fittings, conduits, and/or manifolds may be secured to the ends or edges of the panels 710 through 714, as shown in FIG. 11. A manifold 772 is shown to the left in FIG. 11, separated from the panel assembly in order to show various details. The manifold 772 comprises a continuous plate 774 having a series of tubes or pipes 776 which plug into the corresponding conduits or passages 729 of the panels. Each of the pipes 776 preferably includes an O-ring 778 or other suitable seal to preclude leakage between the pipes 776 and conduits 729. A series of screws 780 engages corresponding screw slots 782, more clearly shown in the detail of FIG. 12, to secure the manifold plate 774 in place on the panel(s).

Alternatively, single fittings may be used, e.g. the straight fitting 784 or elbow 786 shown to the right of the manifold 772 of FIG. 11. Screws 780 grip the edges of circumferential flanges 788 about the fittings, and engage corresponding screw slots 782 to secure the fittings 784, 786, etc. in place. The fittings may have external threads, as shown, or internal threads as shown in the manifold pipes 776, or other attachment means for pipes, tubes, etc. to conduct fluids to and from the conduits 729 of the panels.

Figure 13:
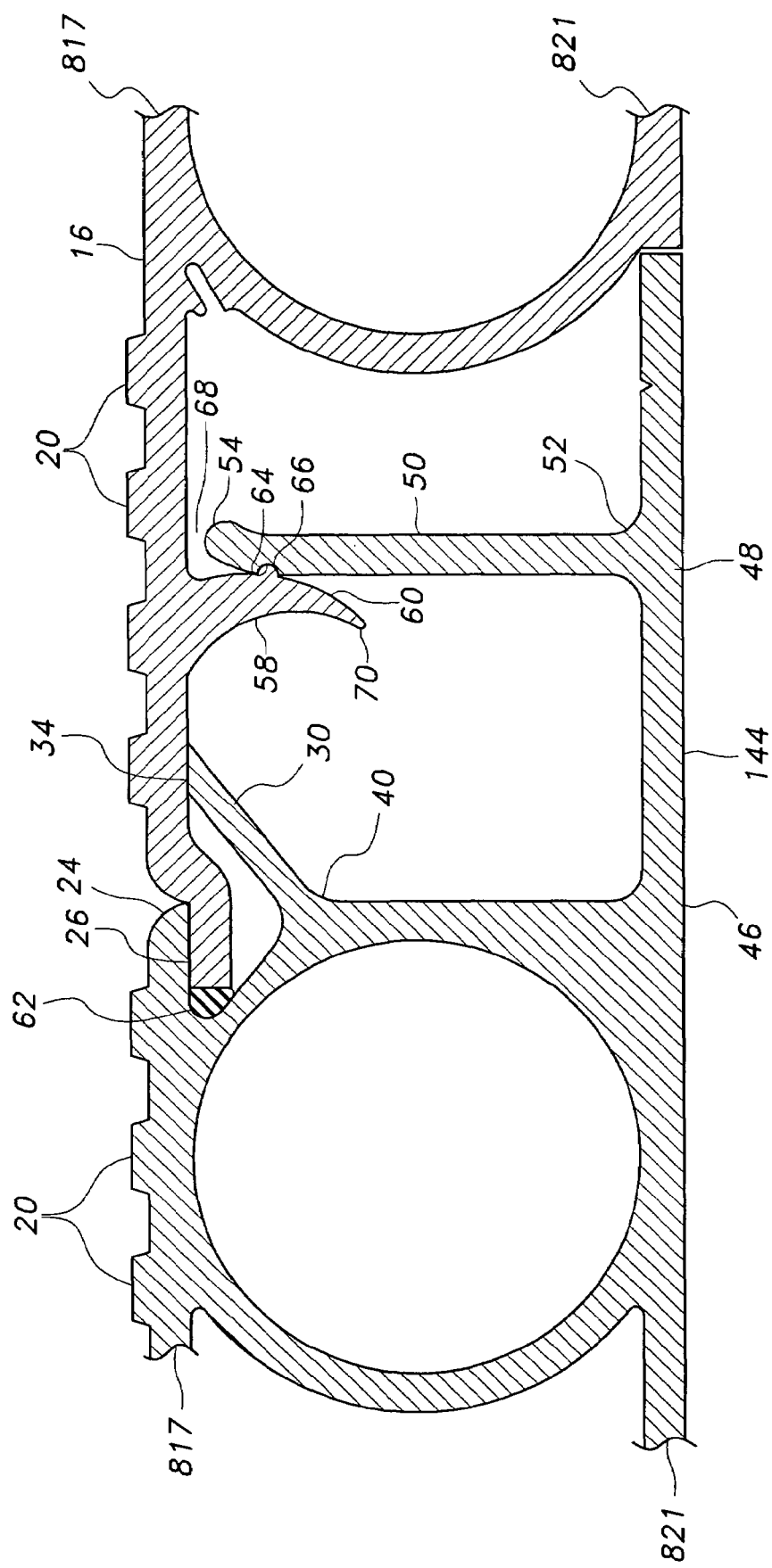
FIG. 13 is an end elevation view in section of two panels comprising an eighth embodiment, having a square or rectangular channel configuration.

FIG. 13 illustrates a cross section of an eighth embodiment of the present watertight decking panels, with the two walls thereof designated as upper wall 817 and opposite lower wall 821. The eighth embodiment panels differ from those of the seventh embodiment only in the internal shape of the channel, with the channel having a flat internal floor and generally squared internal corners. Otherwise, the structure of the eighth embodiment panels of FIG. 13 is substantially identical to the structure of the seventh embodiment panels of FIGS. 10 through 12.

Figure 14:
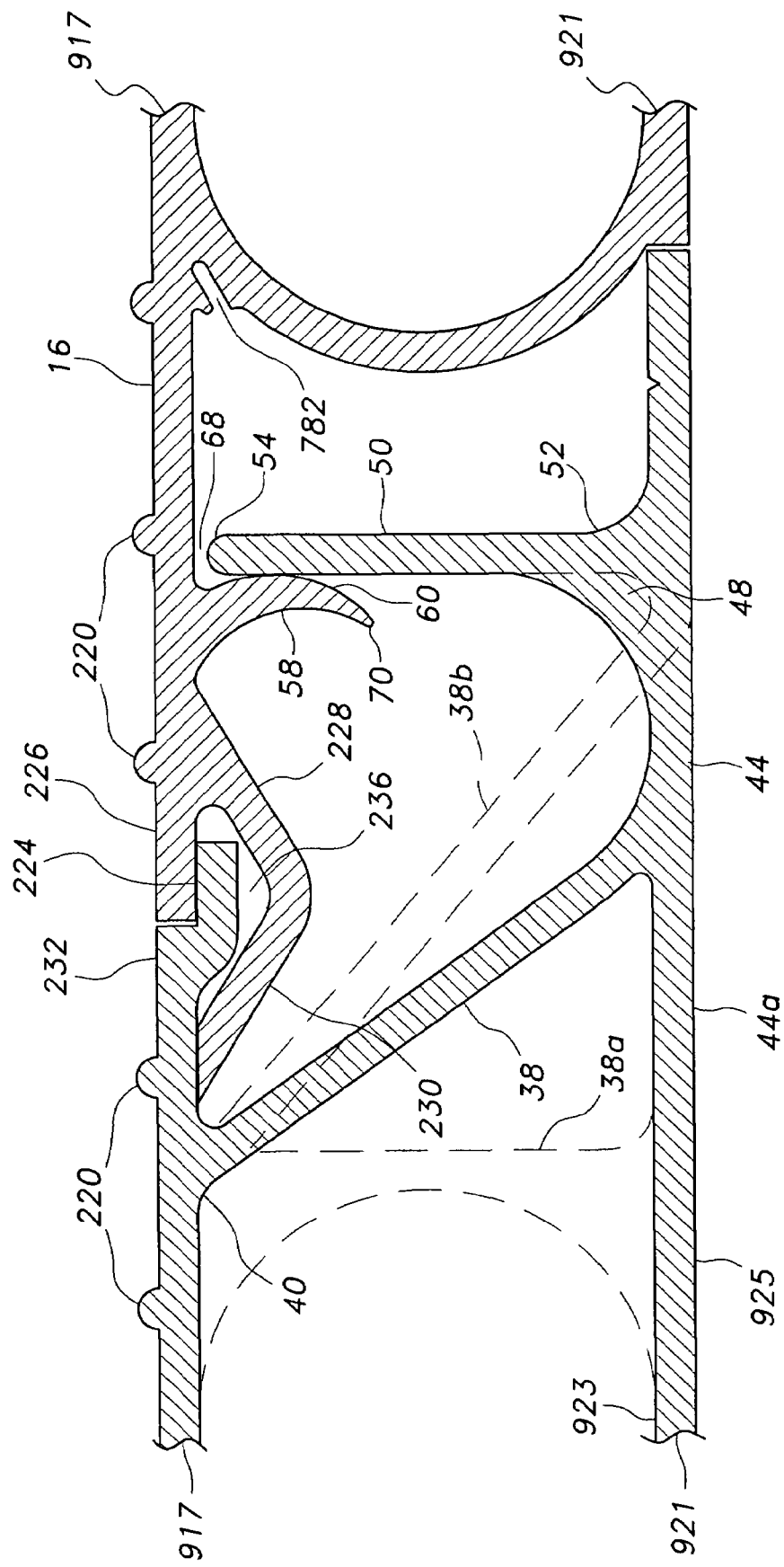
FIG. 14 is an end elevation view in section of two panels comprising a ninth embodiment, wherein the tongue and groove panel edges are reversed from the seventh and eighth embodiments.

FIG. 14 illustrates a cross section of a ninth embodiment of the watertight decking panels, with the panels of FIG. 14 having upper walls 917 and opposite lower walls 921. It will be noted that the ninth embodiment of FIG. 14 is similar to the sixth embodiment of FIG. 9, in that the drawings of the embodiments of FIGS. 9 and 14 illustrate common alternative wall configurations 38, 38a, 38b for the channel, as well as an alternative tongue and groove joint assembly common to both of the embodiments of FIGS. 9 and 14. However, it will be noted that the panel embodiment of FIG. 14 includes a continuous, solid lower wall 921, with its opposite surfaces 923 and 925, in keeping with the continuous, solid lower walls of all of the panel embodiments following those of FIGS. 1 through 5.

Figure 15:
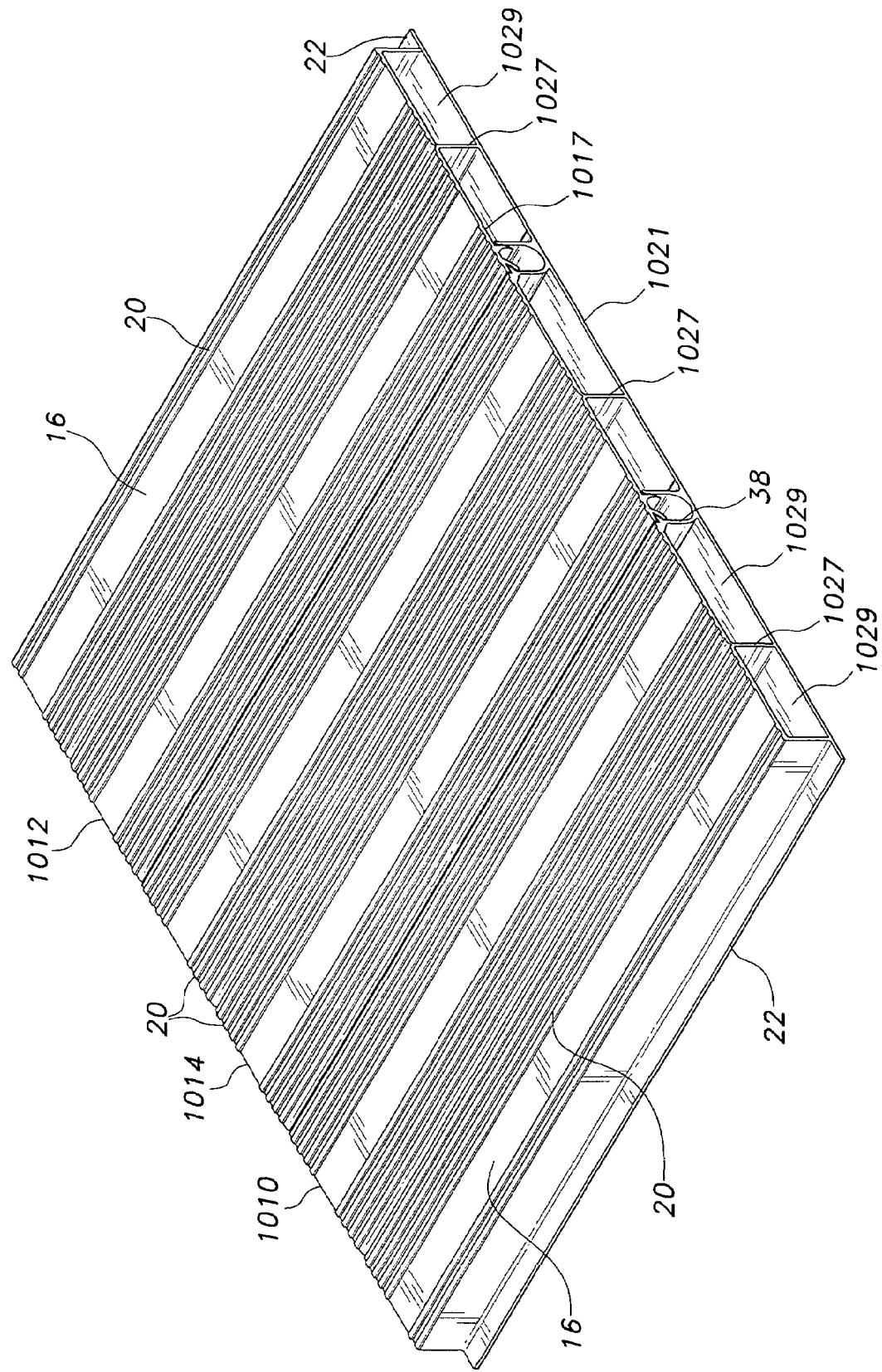
FIG. 15 is a perspective view of an assembled series of panels comprising a tenth embodiment of the watertight decking of the present invention having a second wall or ply opposite the first wall, showing the general configuration of the decking.
Figure 16:
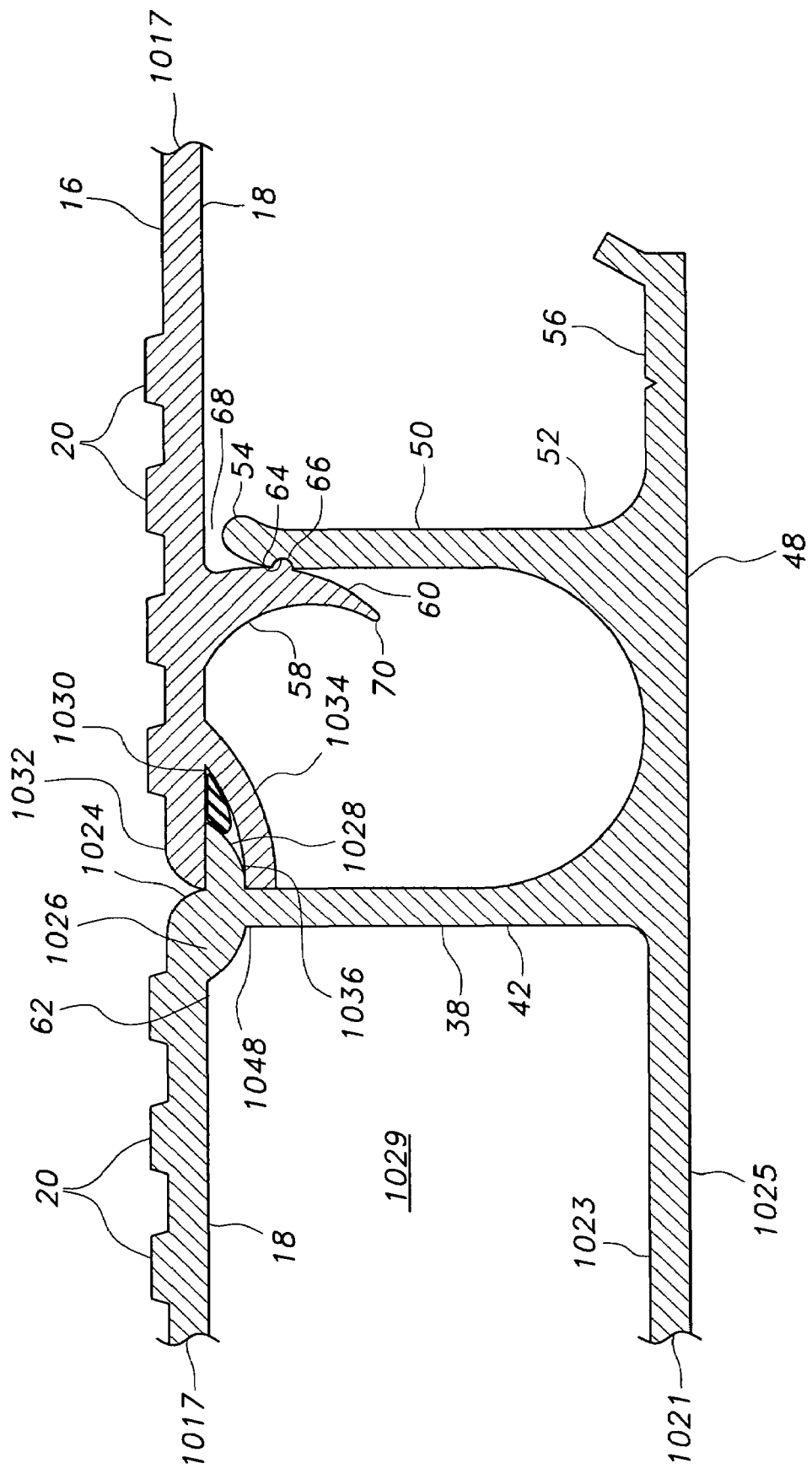
FIG. 16 is an end elevation view in section of two panels of the embodiment of FIG. 15, showing their fit when assembled together.

FIGS. 15 and 16 illustrate a tenth embodiment of the present watertight decking panels, comprising a first end panel 1010, an opposite second end panel 1012, and an intermediate panel 1014. The panels 1010 through 1014 will be seen to be similar to the fourth embodiment panels 410 through 414 of FIGS. 6 and 7, with identical elements being numbered identically. These panels 1010 through 1014 each include an upper or top wall 1017, with the upper and lower surfaces 16 and 18 defining the thickness thereof, and an opposite lower or bottom wall 1021 having an upper surface 1023 and lower surface 1025 defining the thickness thereof. The upper and lower walls 1017 and 1021 are connected by a series of interconnecting elements or webs 1027 extending therebetween, with the two walls 1017 and 1021 and their interconnecting elements 1027 defining a series of conduits or passages 1029 which extend through the length of each extruded panel.

However, the panels 1010 through 1014 differ from the panels 410 through 414 primarily in the configuration of their mating first and second attachment edges 1024 and 1026. In the embodiment of FIGS. 15 and 16, the first attachment edge 1024 includes a tongue 1028 extending therefrom, which engages a mating groove 1030 defined by a first or upper lip 1032 which is coplanar with its panel and a depending arcuate second or lower lip 1034. Upper lip 1032 and lower lip 1034 may describe about one-half of a parabola or about one-quarter of a circle, ellipse, or other arcuate closed figure when viewed from an end view, as shown in FIG. 16. The tongue 1028 preferably has a convex lower curvature 1036 to fit closely with the concave arcuate upper surface of the lower lip 1034 of the adjoining panel edge 1026. The specific arrangement of the tongue and groove components may be reversed in this or other embodiments, as desired. Components of the channel formed by two interconnecting panels and which correspond to channel components of other embodiments, are indicated by corresponding numbers. The same is true of the locking means of the panel embodiment of FIGS. 15 and 16.

Figure 17:
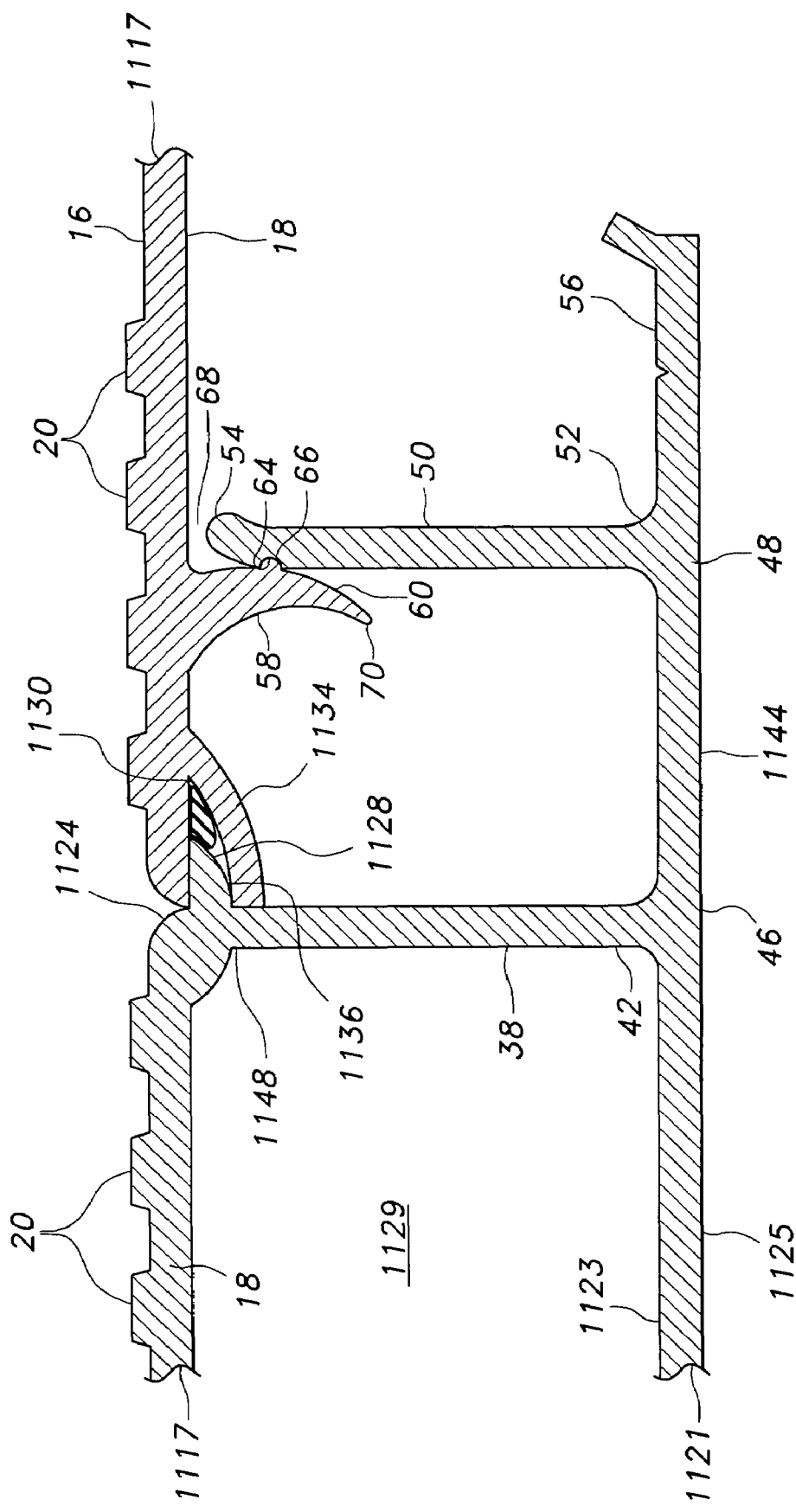
FIG. 17 is an end elevation view in section of two panels comprising an eleventh embodiment, having a square or rectangular channel configuration.

FIG. 17 illustrates an eleventh embodiment of the present watertight decking invention, wherein the channel floor 1144 is flat and forms a continuous and unbroken flat plane with the attachment flange 56. The channel walls 38 and 50 and the flat channel floor 1144 of the FIG. 17 embodiment thus define a generally rectangular channel shape, rather than the U-shaped channel of the embodiment of FIGS. 15 and 16. Other components, e.g. the drip rail 58 with its locking bead 66 and the mating locking groove 64 of the channel second wall 50, etc., are identical to those components described further above for the first embodiment of FIGS. 1 through 3 and tenth embodiment of FIGS. 15 and 16, with the tongue and groove interlocking configuration being similar as well. It has been found that the U-shaped channels of the embodiment of FIGS. 15 and 16 (and FIG. 18, discussed below) are somewhat less critical to form during the extrusion process. However, the specific channel shape is not critical to the inventive concept of the present watertight decking embodiments.

Figure 18:
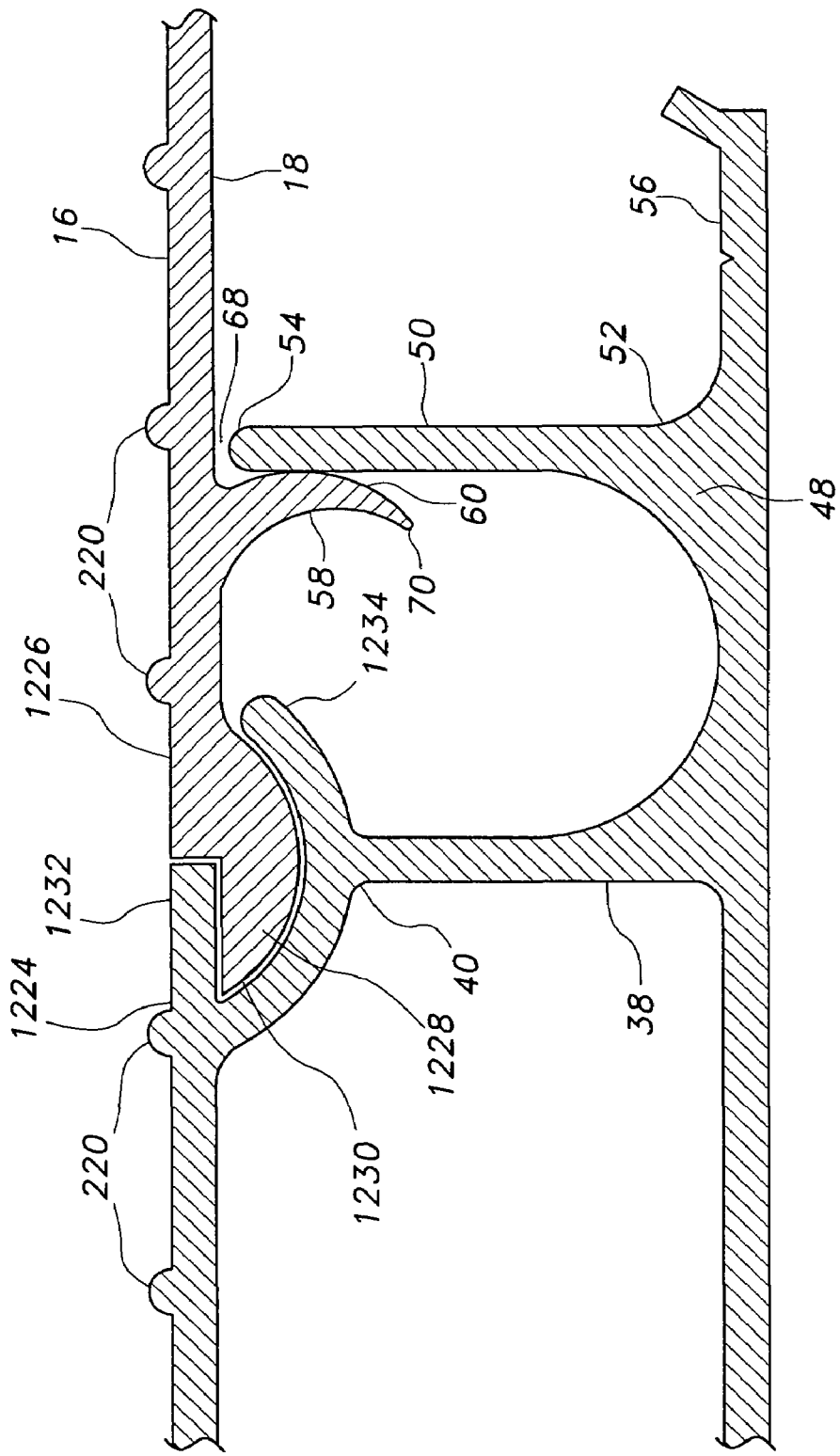
FIG. 18 is an end elevation view in section of two panels comprising a twelfth embodiment, wherein the tongue and groove panel edges are reversed from the tenth and eleventh embodiments.

FIG. 18 provides an illustration of a twelfth embodiment of the present watertight decking invention. The twelfth embodiment of FIG. 18 most closely resembles the embodiment of FIGS. 15 and 16 with its rounded channel floors, but differs primarily in that the tongue and groove components are reversed from their relative locations in the embodiment of FIGS. 15 and 16. In FIG. 8, the tongue 1228 extends from the second attachment edge 1226 of a second end or intermediate panel, while the mating groove 1230 is formed along the first attachment edge 1224 of a first end or intermediate panel.

It will be noted that the tongue and groove shapes are somewhat different from those of the two embodiments of FIGS. 15 through 17, as well. In the embodiment of FIG. 18, the upper edge 40 of the channel first wall 38 extends from an arcuately concave socket which forms the groove 1230 of the assembly, which in turn extends from a line somewhat back from the first or upper lip 1232 extension of the first attachment edge 1224 of the first end or intermediate panel to form the lower lip 1234 of the groove 1230.

The panel joint embodiment of FIG. 18 may have other differences from the embodiments of FIGS. 1 through 4 as well, e.g. a different shape for the ribs 220 (or other traction enhancing means) on the upper surface(s) 16, the omission of the locking bead 66 along the channel wall contact face of the drip rail 58 and corresponding omission of the locking groove 64 along the inner surface of the channel wall 50, etc. These various features may be installed or omitted on any of the embodiments of the present watertight decking panels, as desired. Other components of the embodiment of FIG. 18 are essentially identical to those corresponding components of the embodiments of FIGS. 1 through 4, and are indicated by the same numbers used to identify those components in the other drawing Figs.

Figure 19:
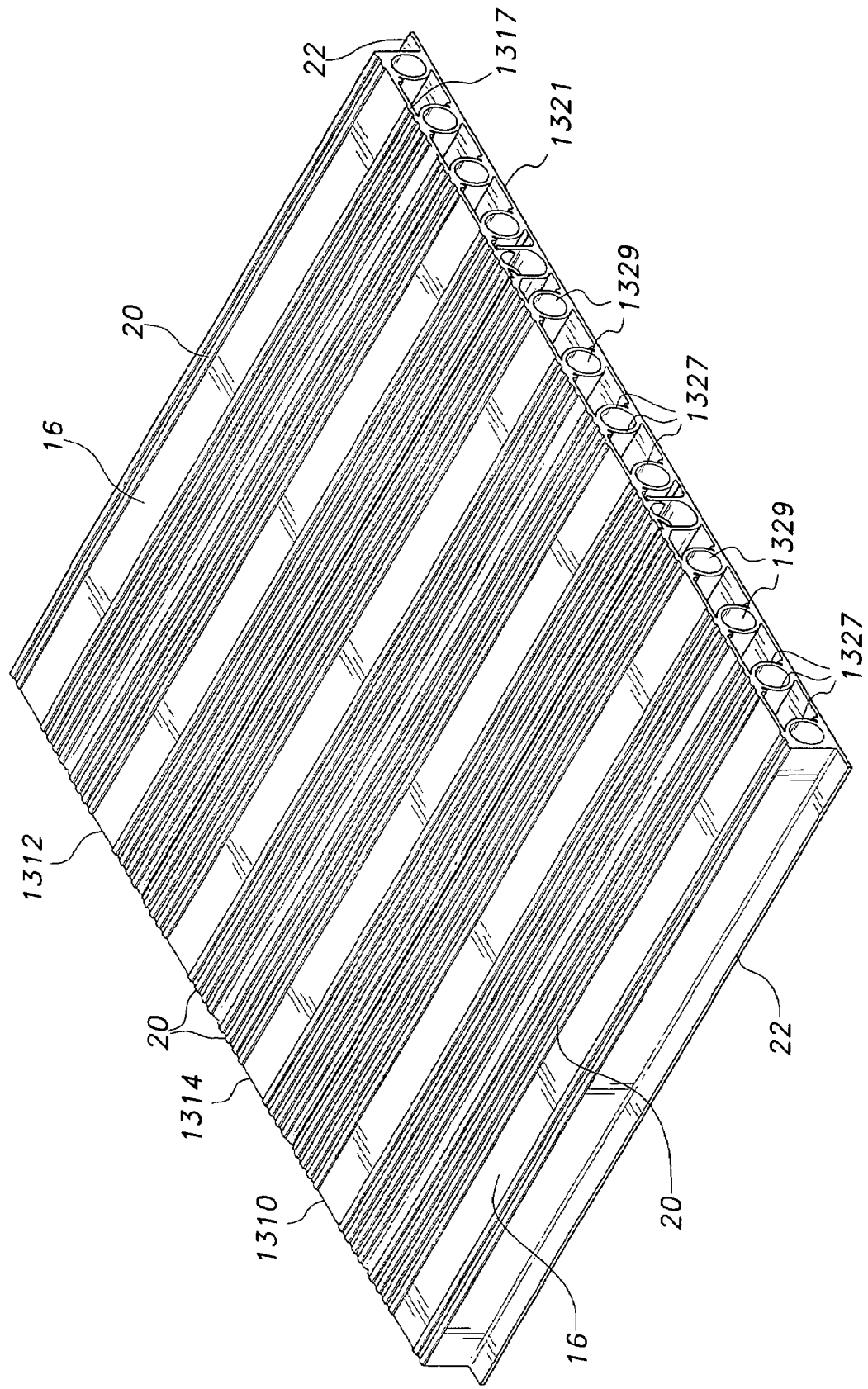
FIG. 19 is a perspective view of an assembled series of panels comprising a thirteenth embodiment of the watertight decking of the present invention having a series of conduits between the first and second walls, showing the general configuration of the decking.
Figure 20:
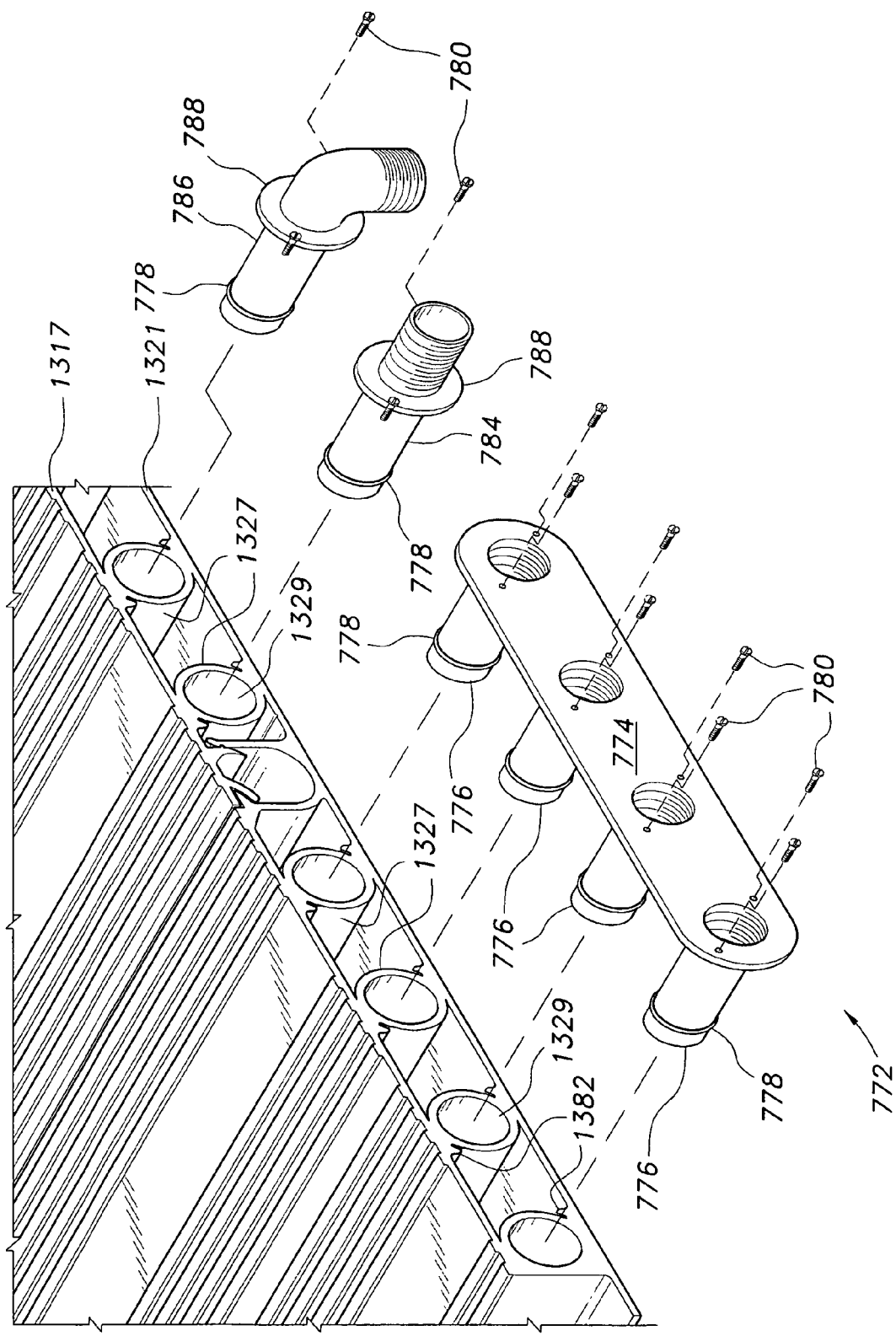
FIG. 20 is a broken away, exploded perspective view of the panel assembly of FIG. 19, showing the optional installation of a manifold and single conduits thereto.
Figure 21:
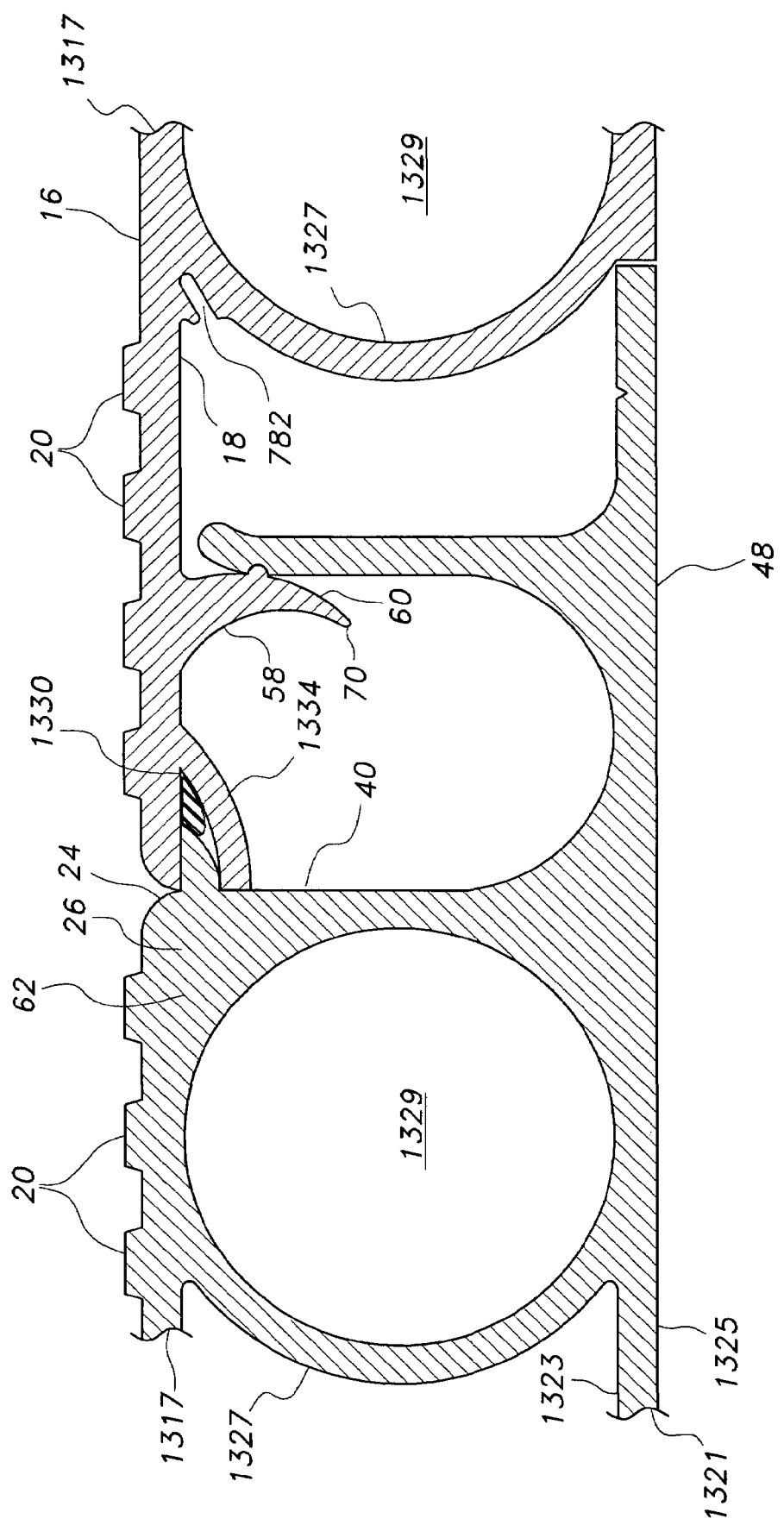
FIG. 21 is an end elevation view in section of two panels of the embodiment of FIG. 19, showing their fit when assembled together.

FIGS. 19 through 21 illustrate a thirteenth embodiment of the present watertight decking panels, comprising a first end panel 1310, an opposite second end panel 1312, and an intermediate panel 1314. The panels 1310 through 1314 of FIGS. 19 through 21 are similar to the panels 710 through 714 of FIGS. 10 through 12, in that both embodiments include an upper or top wall 1317, with the upper and lower surfaces 16 and 18 defining the thickness thereof, and an opposite lower or bottom wall 1321 having an upper surface 1323 and lower surface 1325 defining the thickness thereof. Those elements of the panels 1310 through 1314 which are identical to the first embodiment panels are numbered identically, e.g. the upper surface 16, ribs 20 of the upper surface, outboard edge flanges 22, etc. However, the panels 1310 through 1314 differ from the panels 710 through 714 of FIGS. 10 through 12, due to the different tongue and groove interlocking configuration of the panels. The thirteenth embodiment of FIGS. 19 through 21 includes the tongue and groove configuration illustrated in the tenth and eleventh embodiments of FIGS. 15 through 17.

However, the panel embodiment of FIGS. 19 through 21 includes a series of semicircular interconnecting elements, similarly to the seventh embodiment of FIGS. 10 through 12. In FIGS. 19 through 21, a series of semicircular interconnecting elements 1327 extend between the two walls 1317 and 1321. Adjacent interconnecting element 1327 pairs are arranged in mirror image to one another, thereby defining a series of circular conduits or passages 1329 between each facing interconnecting element, with the conduits or passages 1329 extending through the length of each extruded panel. These conduits or passages 1329 are configured for the passage of various fluids therethrough, just as in the case of the passages 729 of the panel embodiment of FIGS. 10 through 12. Accordingly, various pipe and/or manifold fittings may be connected to the otherwise open ends of the passages 1329 to conduct fluids thereto and therefrom. Various manifold and pipe connector configurations are illustrated in FIG. 20 for this embodiment, with these components being essentially identical to the corresponding components of FIG. 11 and designated identically.

Figure 22:
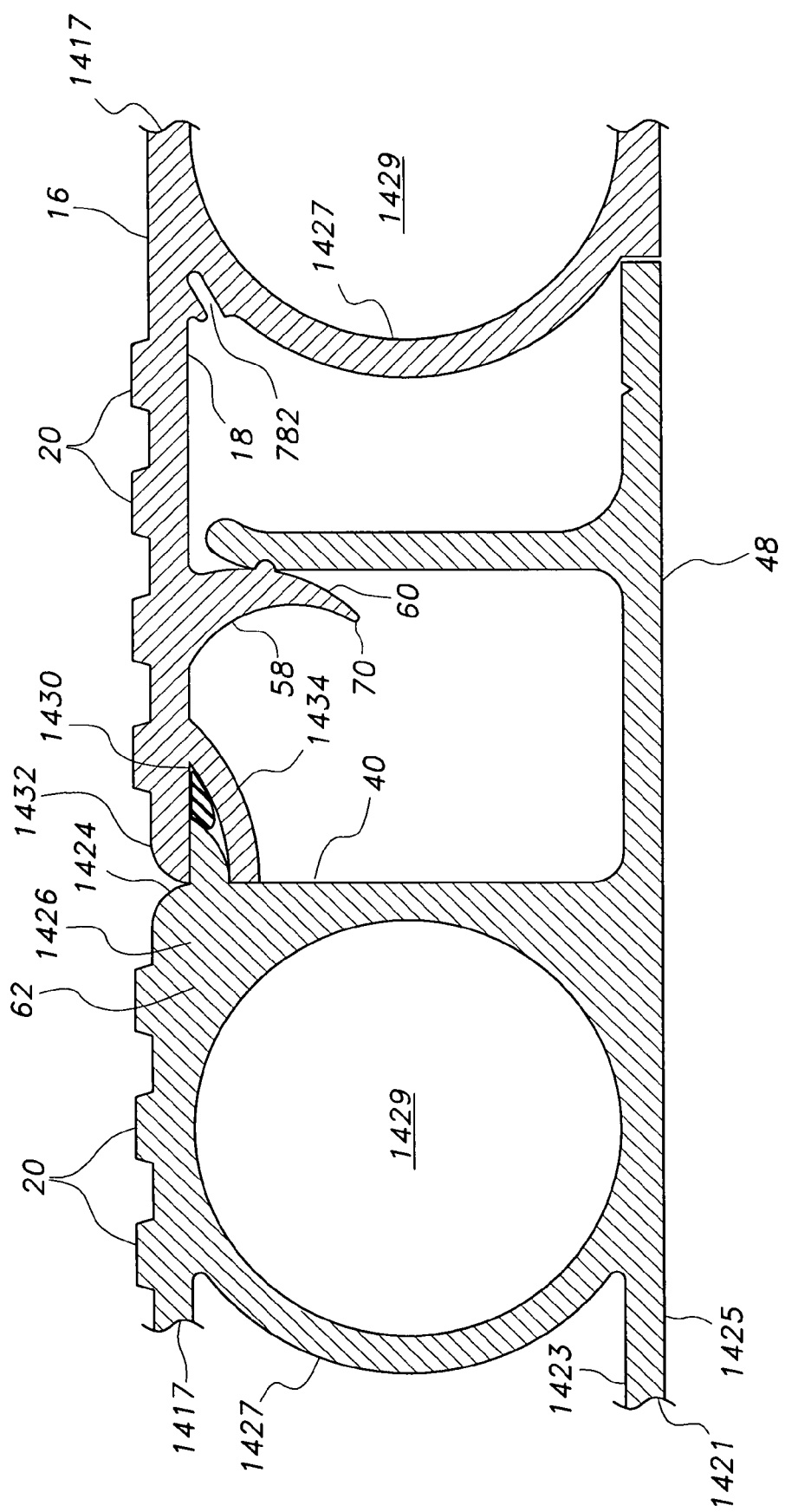
FIG. 22 is an end elevation view in section of two panels comprising a fourteenth embodiment, having a square or rectangular channel configuration.

FIG. 22 illustrates a cross section of a fourteenth embodiment of the present watertight decking panels, with the two walls thereof designated as upper wall 1417 and opposite lower wall 1421. The fourteenth embodiment panels differ from those of the thirteenth embodiment only in the internal shape of the channel, with the channel having a flat internal floor and generally squared internal corners. Otherwise, the structure of the fourteenth embodiment panels of FIG. 22 is substantially identical to the structure of the thirteenth embodiment panels of FIGS. 19 through 21, with corresponding features designated by four digit reference numerals beginning with 14 as the first two characters.

FIG. 23 illustrates a cross section of a fifteenth embodiment of the watertight decking panels, with the panels of FIG. 23 having upper walls 1517 and opposite lower walls 1521. It will be noted that the fifteenth embodiment of FIG. 23 is similar to the ninth embodiment of FIG. 14, in that the drawings of the embodiments of FIGS. 14 and 23 illustrate common alternative wall configurations 38, 38*a*, 38*b* for the channel, as well as an alternative tongue and groove joint assembly common to both of the embodiments of FIGS. 18 and 23. However, it will be noted that the panel embodiment of FIG. 23 includes a continuous, solid lower wall 1521, with its opposite surfaces 1523 and 1525, in keeping with the continuous, solid lower walls of all of the panel embodiments following those of FIGS. 1 through 5.

In conclusion, the present watertight decking embodiments provide a positive means of sealing a deck or other surface to prevent the passage of moisture therethrough, without any other steps being required than assembly of the panels comprising the deck assembly. The present watertight decking may be used in the construction of docks and similar structures where a watertight fit is not necessarily required, but is also well suited for use in constructing roof decks and the like and obviating the need for additional waterproof sheathing beneath the deck panels. While it is anticipated that the present watertight decking panels will be primarily formed of aluminum extrusions, other materials, e.g., plastics of various types, may be used as well, if so desired. The thickness and dimensions of such plastic extrusions may be adjusted as required to provide the required durability.

Another advantage of the present decking is the dual benefit provided by the drip rails which depend from the lower surface of the panels. The drip rails extend downwardly into a drainage channel and are positioned to bear tightly against one of the channel walls, thereby wedging the opposite first and second components of the tongue and groove assembly tightly together to preclude relative motion between panels. This tight fit between panels also precludes squeaking or other noise produced when adjoining panels move relative to one another. The drip rails, with their relatively sharp lower edges, also form a barrier to prevent the capillary flow of moisture around the edges, and cause any moisture which has reached that point to gather along the edges and drip into the channel or gutter therebelow where it can be drained off. Accordingly, the present watertight decking will be most useful to building contractors and others who wish to provide a tight and quiet panel assembly through which water cannot pass, and which therefore needs no additional sheathing, waterproofing, or additional steps and/or materials during assembly.

The watertight decking panels provide an additional advantage as well with their second or lower walls opposite the single upper walls of the earlier embodiments of FIGS. 1 through 5. The provision of second, lower walls for the panels provides a number of additional benefits: First, the space defined between the upper and lower walls or plies may serve as conduits for fluids, wiring, pipe, etc., as desired. The use of this space as conduits is further facilitated by the single fitting or manifold connector means provided in some embodiments. Secondly, the provision of a lower surface serves to stiffen the structure of the panels, thereby enabling them to support greater loads or to be formed using less material. Also, the provision of a lower wall provides a finished appearance for the undersides of the panels, thereby allowing them to be used as a single installation for the floor of an overlying area and ceiling for the underlying area. Accordingly, the present watertight panels will prove to be a most efficient and cost effective means of forming a deck and/or covering and enclosing an underlying area.

It is to be understood that the present invention is not limited to the embodiments described above, but encompasses any and all embodiments within the scope of the following claims.

We claim:

1. Watertight decking, comprising:
    a first end panel, a second end panel, and at least one intermediate panel disposed between said first and said second end panel, each said panel being a rigid, load-bearing extrusion having a generally flat, planar upper wall with an upper surface and a bottom surface, a continuous lower wall opposite said upper wall, said lower wall having an upper surface and a bottom surface, and a plurality of interconnecting elements therebetween;
    said upper wall, said lower wall, and said interconnecting elements defining a plurality of conduits;
    said first end panel and said intermediate panel each having:
        a first attachment edge;
        a channel support leg sloping from the bottom surface of said upper wall, set back from the first attachment edge and extending therebelow, said channel support leg having a lower edge;
        an adjacent panel fulcrum flange sloping upwardly from the lower edge of said channel support leg, said first attachment edge, said channel support leg, and said adjacent panel fulcrum flange defining an adjacent attachment edge groove;
        a channel first wall extending between the lower edge of said channel support leg and the upper surface of said lower wall, said channel first wall further having an upper edge and a lower edge opposite the upper edge thereof;
        a channel second wall extending upwardly from the upper surface of said lower wall and spaced apart from said channel first wall, said channel second wall having a lower edge and an upper edge opposite the lower edge thereof, the upper edge being spaced apart from said first attachment edge, and said channel first wall, said channel second wall, and the portion of said lower wall between the lower edge of said channel first wall and the lower edge of said channel second wall defining a channel therebetween;
    said second end panel and said at least one intermediate panel each further including:
        an offset second attachment edge tongue, engaging the adjacent attachment edge groove of said first end panel and said intermediate panel when assembled therewith; and
        a drip rail depending from said second end panel and said intermediate panel and spaced apart from said second attachment edge tongue thereof, extending into the channel of said first end panel and said intermediate panel and bearing against said channel second wall and wedging said second attachment edge tongue tightly within the adjacent attachment edge groove of the adjacent said panel, forming a tongue and groove assembly and preventing relative lateral movement between adjoining panels when at least two of said first end panel, said second end panel, and said at least one intermediate panel are assembled together.

2. The watertight decking according to claim 1, wherein at least some of said interconnecting elements comprise tubular conduits having circular cross sections.

3. The watertight decking according to claim 2, further including at least one manifold communicating with said tubular conduits.

4. The watertight decking according to claim 1, further including:
    said drip rail having an arcuately convex contact surface bearing against said channel second wall and smoothly increasing engagement pressure of said groove of said first attachment edge against said tongue of said second attachment edge when at least two of said first end, intermediate, and second end panels are assembled together;
    a locking groove disposed along said channel second wall, facing said drip rail; and
    a locking bead disposed along the contact surface of said drip rail, the bead engaging said groove of said channel second wall when at least two of said first end, intermediate, and second end panels are assembled together.

5. The watertight decking according to claim 1, wherein said drip rail has a sharp, lower edge for precluding capillary flow of moisture.

6. The watertight decking according to claim 1, wherein the upper edge of said channel second wall is spaced apart from the bottom surface of said upper wall of the overlying one of said panels when assembled together and defines a gap therebetween.

7. The watertight decking according to claim 1, further including a resilient, moisture sealing bead disposed within said tongue and groove assembly when at least two of said first end, intermediate, and second end panels are assembled together.

8. Watertight decking, comprising:
a first end panel, a second end panel, and at least one intermediate panel disposed between said first and said second end panel, each said panel being a rigid, load-bearing extrusion having a generally flat, planar upper wall with an upper surface and a bottom surface, a continuous lower wall opposite said upper wall, said lower wall having an upper surface and a bottom surface, and a plurality of interconnecting elements therebetween;
said upper wall, said lower wall, and said interconnecting elements defining a plurality of conduits;
said first end panel and said at least one intermediate panel each having:
a first attachment edge;
a tongue and groove assembly first component extending along each said first attachment edge;
a channel first wall extending between each said first attachment edge and the upper surface of said lower wall, said channel first wall further having an upper edge and a lower edge opposite said upper edge thereof;
a channel second wall extending upwardly from the upper surface of said lower wall and spaced apart from said channel first wall, said channel second wall having a lower edge and an upper edge opposite the lower edge thereof, the upper edge being spaced apart from said first attachment edge, and said channel first wall, said channel second wall, and the portion of said lower wall between the lower edge of said channel first wall and the lower edge of said channel second wall defining a channel therebetween;
said second end and said intermediate panels each further including:
a second attachment edge;
a tongue and groove assembly second component disposed along said second attachment edge, said second component engaging said tongue and groove assembly first component of said first attachment edge of said first end panel and said intermediate panel when assembled therewith;
a drip rail depending from said second end panel and said intermediate panel and spaced apart from said second attachment edge thereof, said drip rail extending into said channel of said first end panel and said intermediate panel and bearing against said channel second wall and wedging said first component and said second component of said tongue and groove assembly respectively of said first and said second attachment edge tightly together, completing said tongue and groove assembly and preventing relative lateral movement between adjoining panels when at least two of said first end panel, said second end panel and said intermediate panel are assembled together; and
said drip rail having a sharp lower edge for precluding capillary moisture flow.

9. The watertight decking according to claim 8, wherein:
said tongue and groove assembly first component comprises a tongue; and
said tongue and groove assembly second component comprises a groove.

10. The watertight decking according to claim 8, wherein at least some of said interconnecting elements comprise tubular conduits having circular cross sections.

11. The watertight decking according to claim 10, further including at least one manifold communicating with said tubular conduits.

12. The watertight decking according to claim 8, further including:
said drip rail having an arcuately convex contact surface bearing against said channel second wall and smoothly increasing engagement pressure of said groove of said first attachment edge against said tongue of said second attachment edge when at least two of said first end, intermediate, and second end panels are assembled together;
a locking groove disposed along said channel second wall, facing said drip rail; and
a locking bead disposed along the contact surface of said drip rail, the bead engaging said groove of said channel second wall when at least two of said first end, intermediate, and second end panels are assembled together.

13. The watertight decking according to claim 8, wherein said upper edge of said channel second wall is spaced apart from the bottom surface of said upper wall of the overlying one of said panels when assembled together and defines a gap therebetween.

14. The watertight decking according to claim 8, further including a resilient, moisture sealing bead disposed within said tongue and groove assembly when at least two of said first end, intermediate, and second end panels are assembled together.

15. Watertight decking, comprising:
a first end panel, a second end panel, and at least one intermediate panel disposed between said first and said second end panel, each said panel being a rigid, load-bearing extrusion having a generally flat, planar upper wall with an upper surface and a bottom surface, a continuous lower wail opposite said upper wall, said lower wall having an upper surface and a bottom surface, and a plurality of interconnecting elements therebetween;
said upper wail, said lower wail, and said interconnecting elements defining a plurality of conduits;
said first end panel and said at least one intermediate panel each having:
a first attachment edge;
a tongue and groove assembly first component extending along each said first attachment edge;
a channel first wall extending between each said first attachment edge and the upper surface of said lower wall, said channel first wall further having an upper edge and a lower edge opposite said upper edge thereof;
a channel second wall extending upwardly from the upper surface of said lower wall and spaced apart from said channel first wall, said channel second wall having a lower edge and an upper edge opposite the lower edge thereof, the upper edge being spaced apart from said first attachment edge, and said channel first wall, said channel second wall, and the portion of said lower wall between the lower edge of said channel first wall and the lower edge of said channel second wall defining a channel therebetween;
said second end panel and said at least one intermediate panel each further including:
a second attachment edge;
a tongue and groove assembly second component disposed along said second attachment edge, said second component engaging said tongue and groove assembly first component of said first attachment edge of said first end panel and said intermediate panel when assembled therewith;
a drip rail depending from said second end panel and said intermediate panel and spaced apart from said second attachment edge thereof, said drip rail extending into said channel of said first end panel and said intermediate panel and bearing against said channel second wall and wedging said first component and said second component of said tongue and groove assembly respectively of said first and said second attachment edge tightly together, completing said tongue and groove assembly and preventing relative lateral movement between adjoining panels when at least two of said first end panel, said second end panel and said intermediate panel are assembled together; and said upper edge of said channel second wall is spaced apart from said bottom surface of said upper wall of the overlying one of said panels when assembled together, and defines a gap therebetween.

16. The watertight decking according to claim 15, wherein:

said tongue and groove assembly first component comprises a tongue; and said tongue and groove assembly second component comprises a groove.

17. The watertight decking according to claim 15, wherein at least some of said interconnecting elements comprise tubular conduits having circular cross sections.

18. The watertight decking according to claim 15, further including at least one manifold communicating with said tubular conduits.

19. The watertight decking according to claim 15, further including:

said drip rail having an arcuately convex contact surface bearing against said channel second wall and smoothly increasing engagement pressure of said groove of said first attachment edge against said tongue of said second attachment edge when at least two of said first end, intermediate, and second end panels are assembled together;

a locking groove disposed along said channel second wall, facing said drip rail; a locking bead disposed along the contact surface of said drip rail, the bead engaging said groove of said channel second wall when at least two of said first end, intermediate, and second end panels are assembled together; and said drip rail further having a sharp lower edge for precluding capillary flow of moisture.

20. The watertight decking according to claim 15, further including a resilient, moisture sealing bead disposed within said tongue and groove assembly when at least two of said first end, intermediate, and second end panels are assembled together.

* * * * *